US012748527B2

(12) United States Patent
Chen et al.

(10) Patent No.: US 12,748,527 B2
(45) Date of Patent: Sep. 29, 2026

(54) SDS-ENABLED DISAGGREGATED INFRASTRUCTURE DIRECT I/O EXECUTION SYSTEM

(71) Applicant: Dell Products L.P., Round Rock, TX (US)

(72) Inventors: Xiangping Chen, Sherborn, MA (US); Xunce Zhou, Shrewsbury, MA (US); David L. Black, Acton, MA (US)

(73) Assignee: Dell Products L.P., Round Rock, TX (US)

(*) Notice: Subject to any disclaimer, the term of this patent is extended or adjusted under 35 U.S.C. 154(b) by 19 days.

(21) Appl. No.: 18/406,396

(22) Filed: Jan. 8, 2024

(65) Prior Publication Data

US 2025/0224869 A1 Jul. 10, 2025

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

| | | | | |
|---|---|---|---|---|
| 9,262,197 | B2 * | 2/2016 | Chawla | G06F 9/45558 |
| 10,223,326 | B2 | 3/2019 | Frank et al. | |
| 2018/0314658 | A1 * | 11/2018 | Iyer | G06F 13/36 |
| 2018/0341429 | A1 * | 11/2018 | Bolkhovitin | G06F 3/067 |
| 2019/0222649 | A1 * | 7/2019 | Cheng | G06F 3/061 |
| 2020/0050388 | A1 * | 2/2020 | Takata | H04L 67/1097 |
| 2020/0225874 | A1 * | 7/2020 | Nimmagadda | G06F 3/0661 |
| 2021/0326270 | A1 * | 10/2021 | Zou | G06F 12/0246 |
| 2022/0050932 | A1 * | 2/2022 | Levy | G06F 3/0673 |
| 2022/0318106 | A1 * | 10/2022 | Cosby | G06F 3/0644 |
| 2023/0342087 | A1 * | 10/2023 | He | G06F 13/1668 |
| 2024/0231706 | A1 * | 7/2024 | Matsushita | G06F 3/065 |

OTHER PUBLICATIONS

Raghunath, Arun, Yi Zou, and Anjaneya Chagam. "On Evolving Software Defined Storage Architecture." 2020 IEEE International Conference on Cloud Computing Technology and Science (CloudCom). IEEE, 2020. (Year: 2020).*

(Continued)

*Primary Examiner* — Nicholas J Simonetti
(74) *Attorney, Agent, or Firm* — Joseph Mencher

(57) ABSTRACT

A Software-Defined Storage (SDS)-enabled disaggregated infrastructure direct Input/Output (I/O) execution system includes an SDS subsystem that is coupled to each of a computing system and a storage system. The SDS subsystem receives an I/O command from the computing system that is directed to the storage system and that includes computing system direct memory access information. The SDS subsystem translates the I/O command to provide a translated I/O command. The SDS subsystem then provides the translated I/O command along with the computing system direct memory access information to the storage system. The storage system may then execute the translated I/O command directly with the computing system using the computing system direct memory access information.

20 Claims, 21 Drawing Sheets

(56) References Cited

OTHER PUBLICATIONS

Bangash, Yawar Abbas, et al. "Incast mitigation in a data center storage cluster through a dynamic fair-share buffer policy." IEEE Access 7 (2019): 10718-10733. (Year: 2019).*
Li, Zheng, et al. "A software-defined fusion storage system for PCM and NAND flash." 2015 IEEE Non-Volatile Memory System and Applications Symposium (NVMSA). IEEE, 2015. (Year: 2015).*
Reidys, Benjamin, et al. "Rackblox: A software-defined rack-scale storage system with network-storage co-design." Proceedings of the 29th Symposium on Operating Systems Principles. 2023. (Year: 2023).*

* cited by examiner

SDS-ENABLED DISAGGREGATED INFRASTRUCTURE DIRECT I/O EXECUTION SYSTEM

BACKGROUND

The present disclosure relates generally to information handling systems, and more particularly to the use of Software-Defined Storage (SDS) to enable the execution of Input/Output (I/O) commands directly in information handling systems provided by disaggregated infrastructure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Disaggregated infrastructure provided by, for example, server devices and their components, storage systems, and/or other disaggregated infrastructure components known in the art, are sometimes used to provide Logically Composed Systems (LCSs) and/or other information handling systems to users that include logical systems whose functionality is provided by disaggregated infrastructure components. The use of disaggregated infrastructures for LCSs provides flexibility via on-demand composition of LCSs, as well as independent scaling of compute, storage, and/or other LCS resources, but can introduce issues with regard to performance and resource utilization. For example, the disaggregation of storage resources from the LCSs that use them often requires any Input/Output (I/O) commands from the LCS to move through multiple "hops" for execution (e.g., from the LCS, through one or more SDS subsystems, and to a storage system), requiring the use of processing resources, memory resources, and network bandwidth when data must be forwarded and copied at those "hops".

Accordingly, it would be desirable to provide a disaggregated infrastructure I/O execution system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Software-Defined Storage (SDS) engine that is configured to: receive, from a computing system, an Input/Output (I/O) command that is directed to a storage system and that includes computing system direct memory access information; translate the I/O command to provide a translated I/O command; and provide the translated I/O command along with the computing system direct memory access information to the storage system to cause the storage system to execute the translated I/O command directly with the computing system using the LCS direct memory access information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives and/or Solid State Drives (SSDs), one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
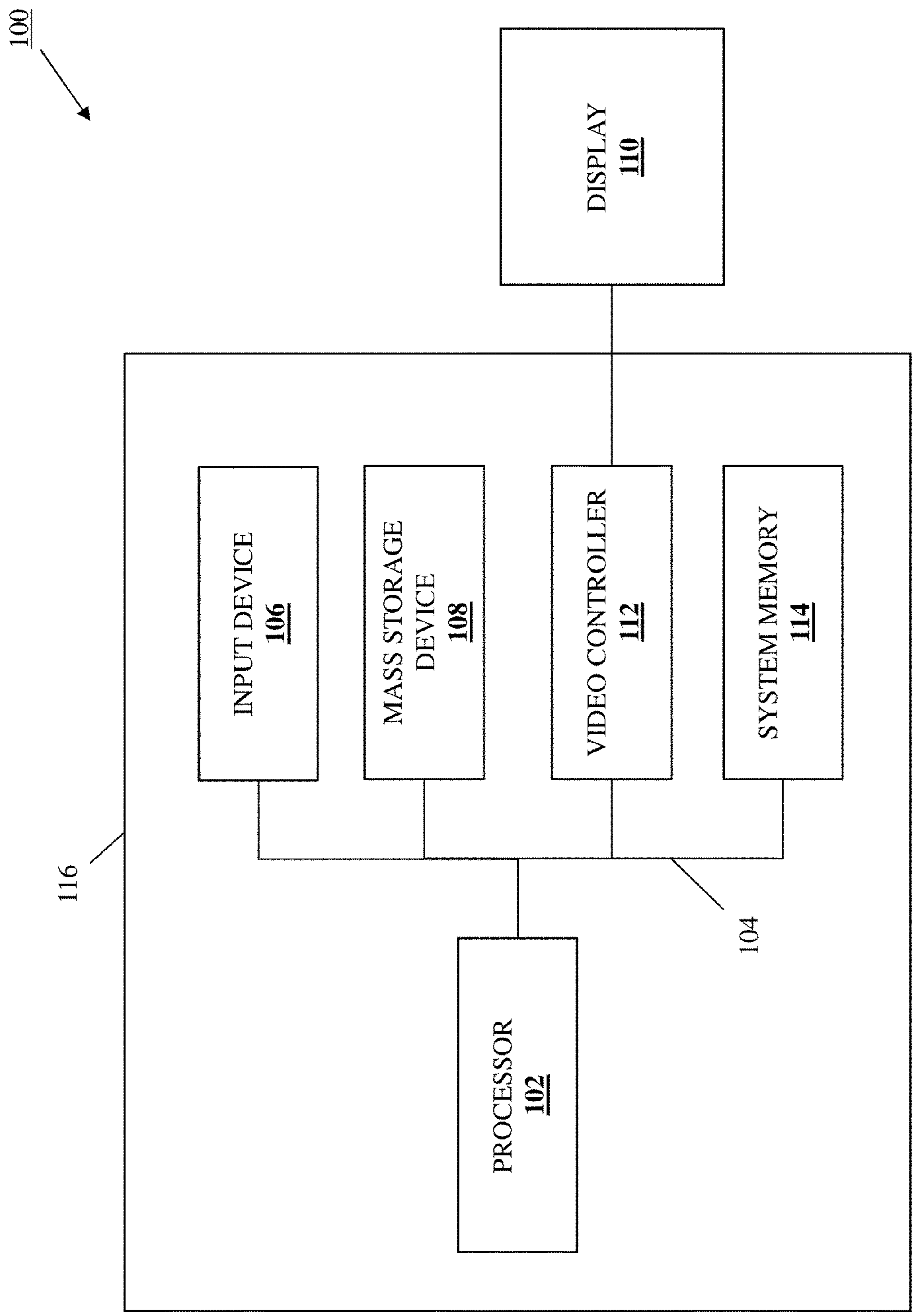
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other interconnects (e.g., buses) and intermediate circuits can be deployed between the components described above and processor 102 to facilitate interconnection between the components and the processor 102.

As discussed in further detail below, the Software-Defined Storage (SDS)-enabled disaggregated infrastructure direct Input/Output (I/O) execution systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
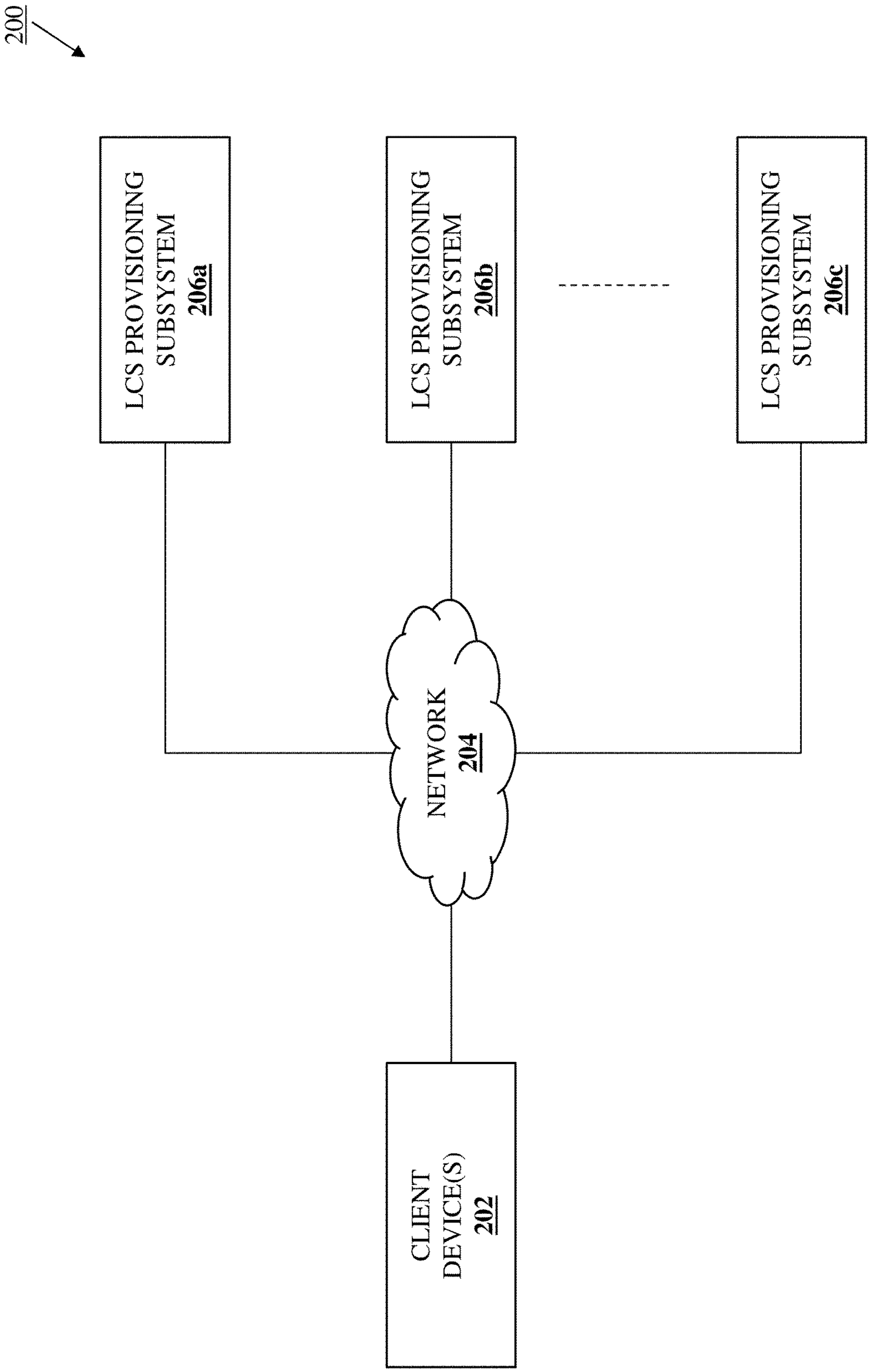
FIG. 2 is a schematic view illustrating an embodiment of an LCS provisioning system.

With reference to FIG. 2, an embodiment of a Logically Composed System (LCS) provisioning system 200 is illustrated that may be utilized with the SDS-enabled disaggregated infrastructure direct I/O execution systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), a Wide Area Network (WAN), the Internet, combinations thereof, and/or any other network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
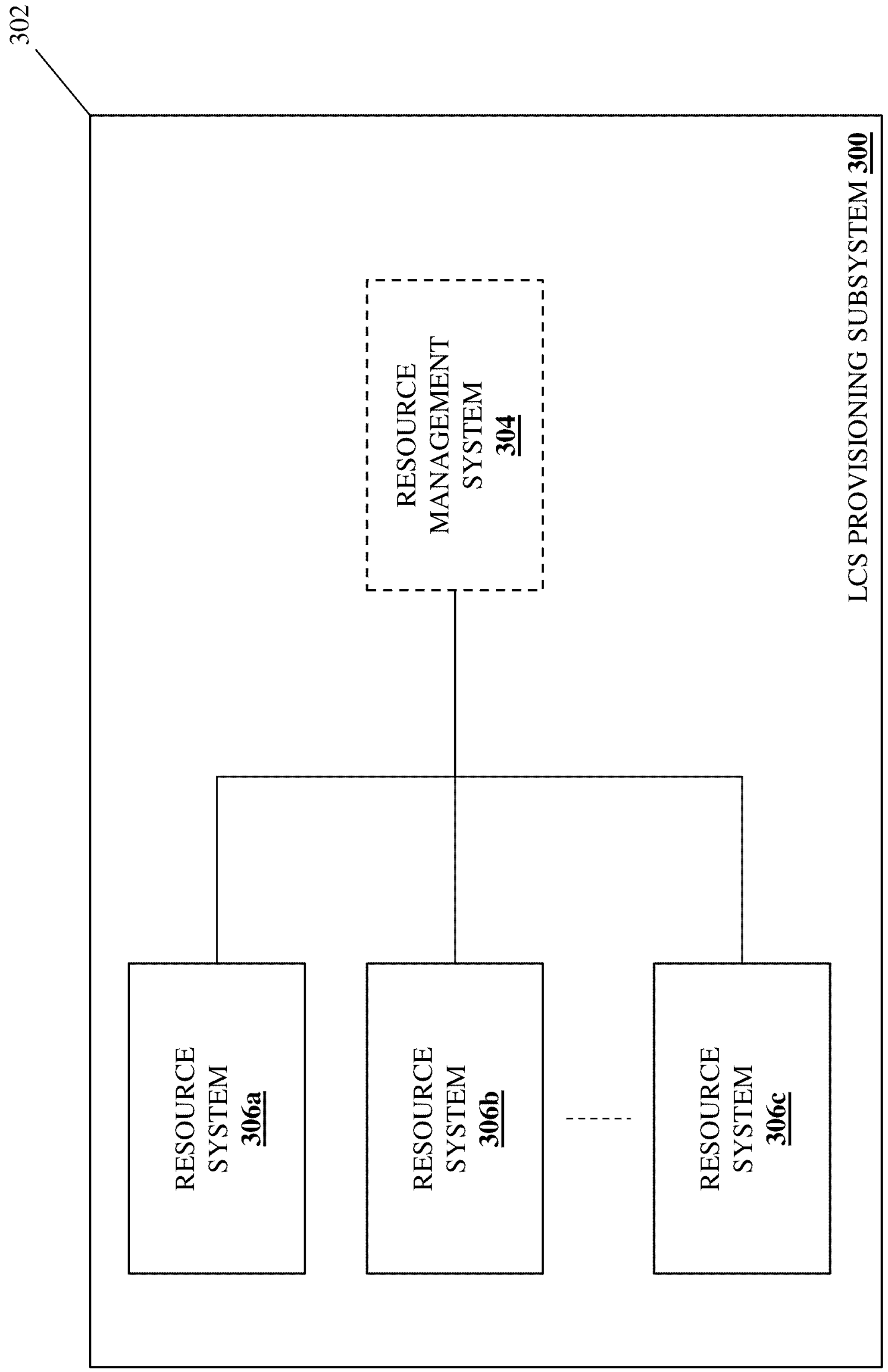
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302 or any other computing environment that would be apparent to one of skill in the art in possession of the present disclosure, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein. However, while described as being provided by an SCP device, one of skill in the art in possession of the present disclosure will appreciate how the SCP devices described herein may be provided by SmartNIC devices, Data Processing Units (DPUs), Infrastructure Processing Units (IPUs), other programmable processing systems that relatively tightly integrate general purpose CPUs with network interface hardware, and/or other LCS provisioning components that would be apparent to one of skill in the art in possession of the present disclosure.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
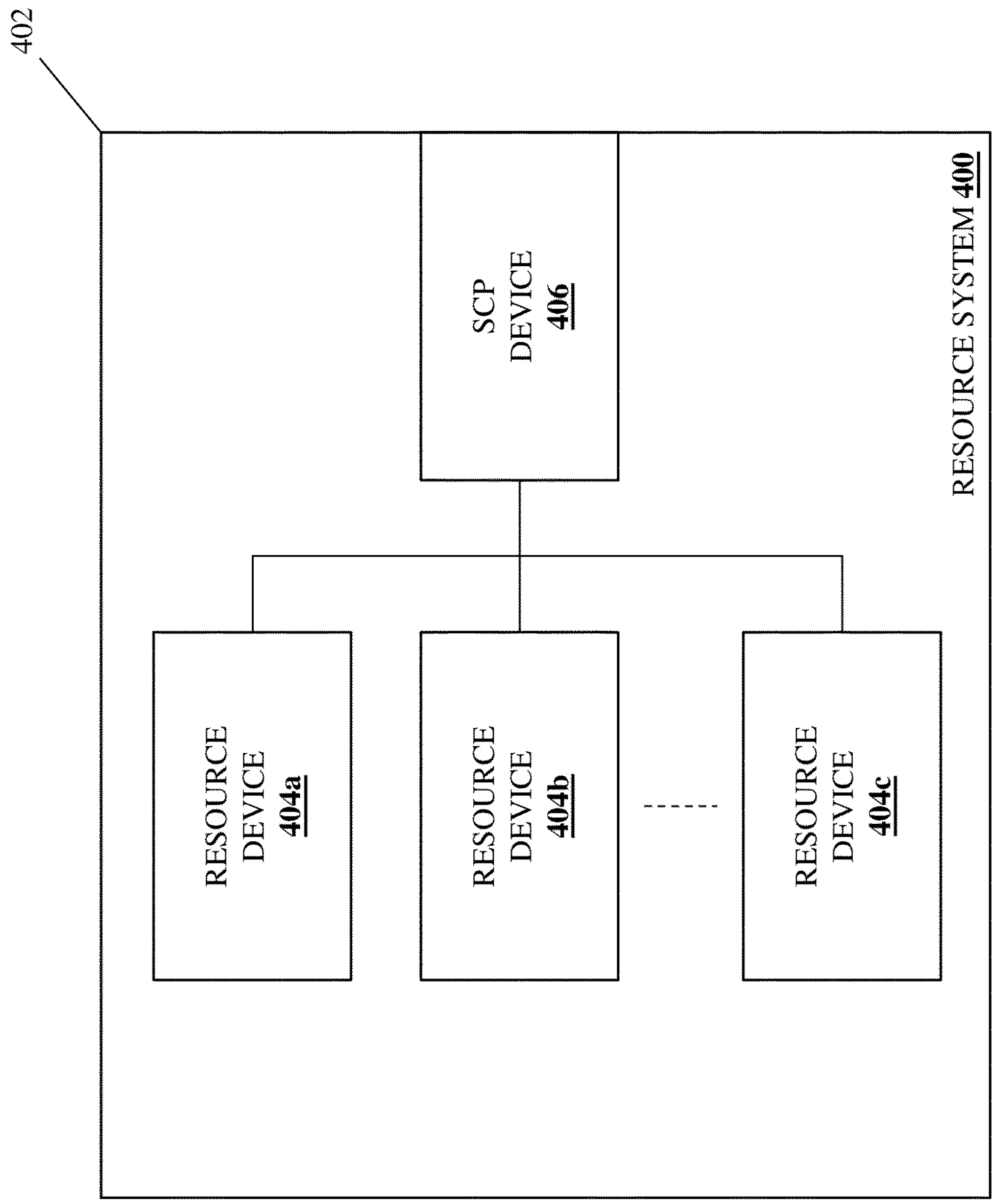
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. However, while illustrated and discussed as being provided by a physical resource system including a physical chassis that houses its component, one of skill in the art in possession of the present disclosure will appreciate how the resource systems of the present disclosure may be virtual resource systems logically contained in a virtual chassis while remaining within the scope of the present disclosure as well.

In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below. However, as discussed above, the SCP device 406 may be replaced by SmartNIC devices, DPUs, IPUs, other programmable processing systems that relatively tightly integrate general purpose CPUs with network interface hardware, and/or other LCS provisioning components that would be apparent to one of skill in the art in possession of the present disclosure In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU)

devices, Tensor Processing Unit (TPU) devices, Field Programmable Gate Array (FPGA) devices, accelerator devices, etc.); memory systems (e.g., Persistent MEMory (PMEM) devices (e.g., solid state byte-addressable memory devices that reside on a memory bus), etc.); storage devices (e.g., Non-Volatile Memory Express (NVMe) storage devices, NVMe over Fabric (NVMe-oF) storage devices, Just a Bunch Of Flash (JBOF) systems, etc.); networking devices (e.g., Network Interface Card (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a few specific examples of functionality available from SCP devices, the SCP devices described herein may operate to provide a Root-of-Trust (ROT) for their corresponding resource devices/systems, to provide an intent management engine for managing the workload intents discussed below, to perform telemetry generation and/or reporting operations for their corresponding resource devices/systems, to perform identity operations (e.g., attestation operations) for their corresponding resource devices/systems, provide an image boot engine (e.g., an operating system image boot engine including a boot image repository and associated functionality that is configured to enable boot from the boot image repository) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciate that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that may provide dedicated server hosting to a single tenant or multi-tenant server hosting to multiple tenants, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404*a*-404*c*. For example, the chassis 402 of the resource system 400 may house a plurality of processing systems (e.g., instantiations of the resource devices 404*a*-404*c*) coupled to the SCP device 406. In another example, the chassis 402 of the resource system 400 may house a plurality of memory systems (e.g., instantiations of the resource devices 404*a*-404*c*) coupled to the SCP device 406. In another example, the chassis 402 of the resource system 400 may house a plurality of storage devices (e.g., instantiations of the resource devices 404*a*-404*c*) coupled to the SCP device 406. In another example, the chassis 402 of the resource system 400 may house a plurality of networking devices (e.g., instantiations of the resource devices 404*a*-404*c*) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 operates with the resource management system 304 (e.g., an SCPM subsystem) to allocate any of its resources devices 404*a*-404*c* for use in a providing an LCS. Furthermore, the SCP device 406 in the resource system 400 may also operate to allocate SCP hardware and/or perform functionality (functionality that may not be available in a resource device that it has allocated for use in providing an LCS) in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404*a*-404*c* while remaining within the scope of the present disclosure as well.

Figure 5:
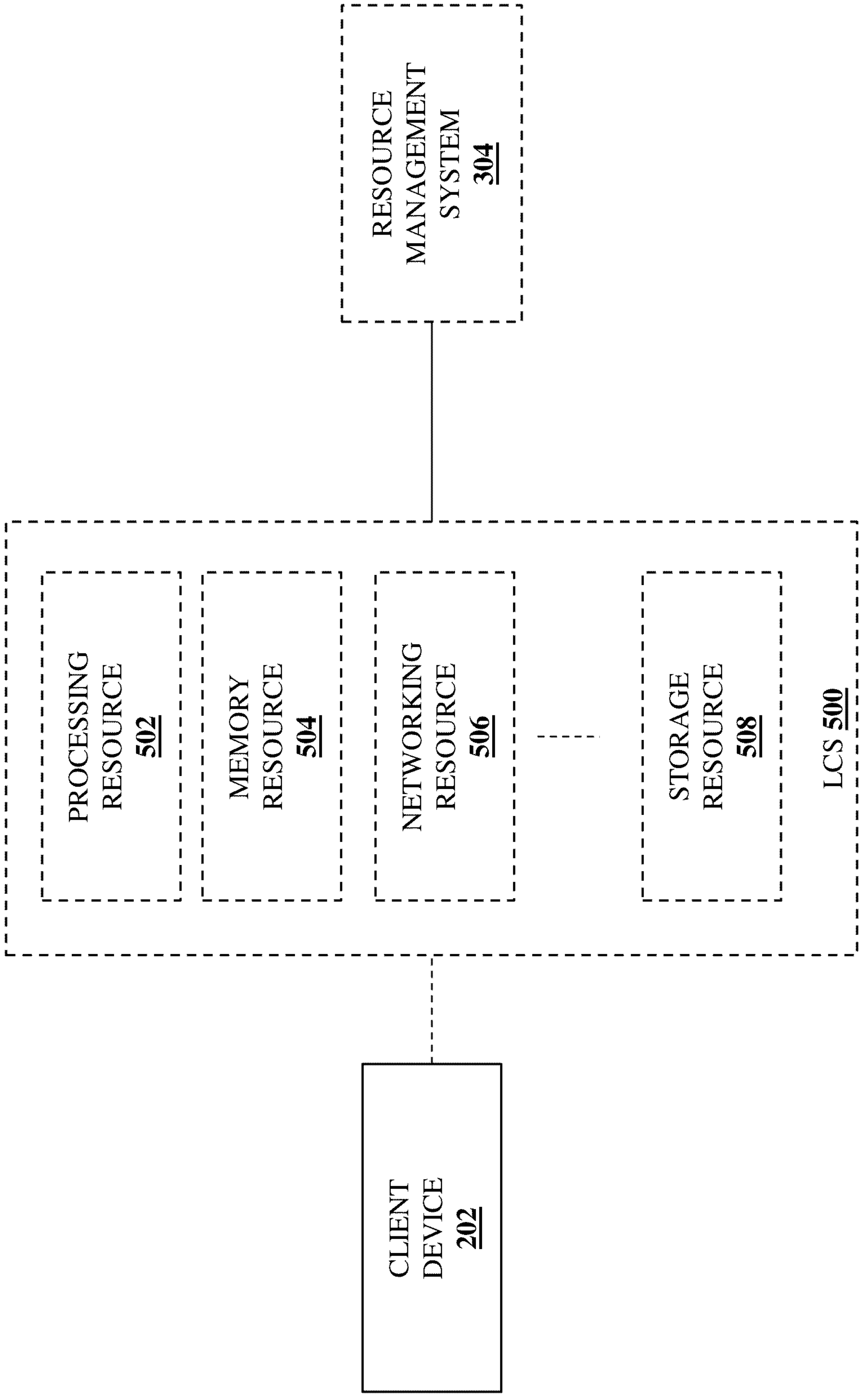
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206*a*-206*c*, and may be satisfied using resource systems that are included within that LCS provisioning subsystem, or satisfied using resource systems that are included across the different LCS provisioning subsystems 206*a*-206*c*.

As such, the resource management system 304 in the LCS provisioning subsystem that received the workload intent may operate to compose the LCS 500 using resource devices 404*a*-404*c* in the resource systems 306*a*-306*c*/400 in that LCS provisioning subsystem, and/or resource devices 404*a*-404*c* in the resource systems 306*a*-306*c*/400 in any of the other LCS provisioning subsystems. FIG. 5 illustrates the LCS 500 including a processing resource 502 allocated from one or more processing systems provided by one or more of the resource devices 404*a*-404*c* in one or more of the resource systems 306*a*-306*c*/400 in one or more of the LCS provisioning subsystems 206*a*-206*c*, a memory resource 504 allocated from one or more memory systems provided by one or more of the resource devices 404*a*-404*c* in one or more of the resource systems 306*a*-306*c*/400 in one or more of the LCS provisioning subsystems 206*a*-206*c*, a networking resource 506 allocated from one or more networking devices provided by one or more of the resource devices 404*a*-404*c* in one or more of the resource systems 306*a*-306*c*/400 in one or more of the LCS provisioning subsystems 206*a*-206*c*, and/or a storage resource 508 allocated from one or more storage devices provided by one or more of the resource devices 404*a*-404*c* in one or more of the resource systems 306*a*-306*c*/400 in one or more of the LCS provisioning subsystems 206*a*-206*c*.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
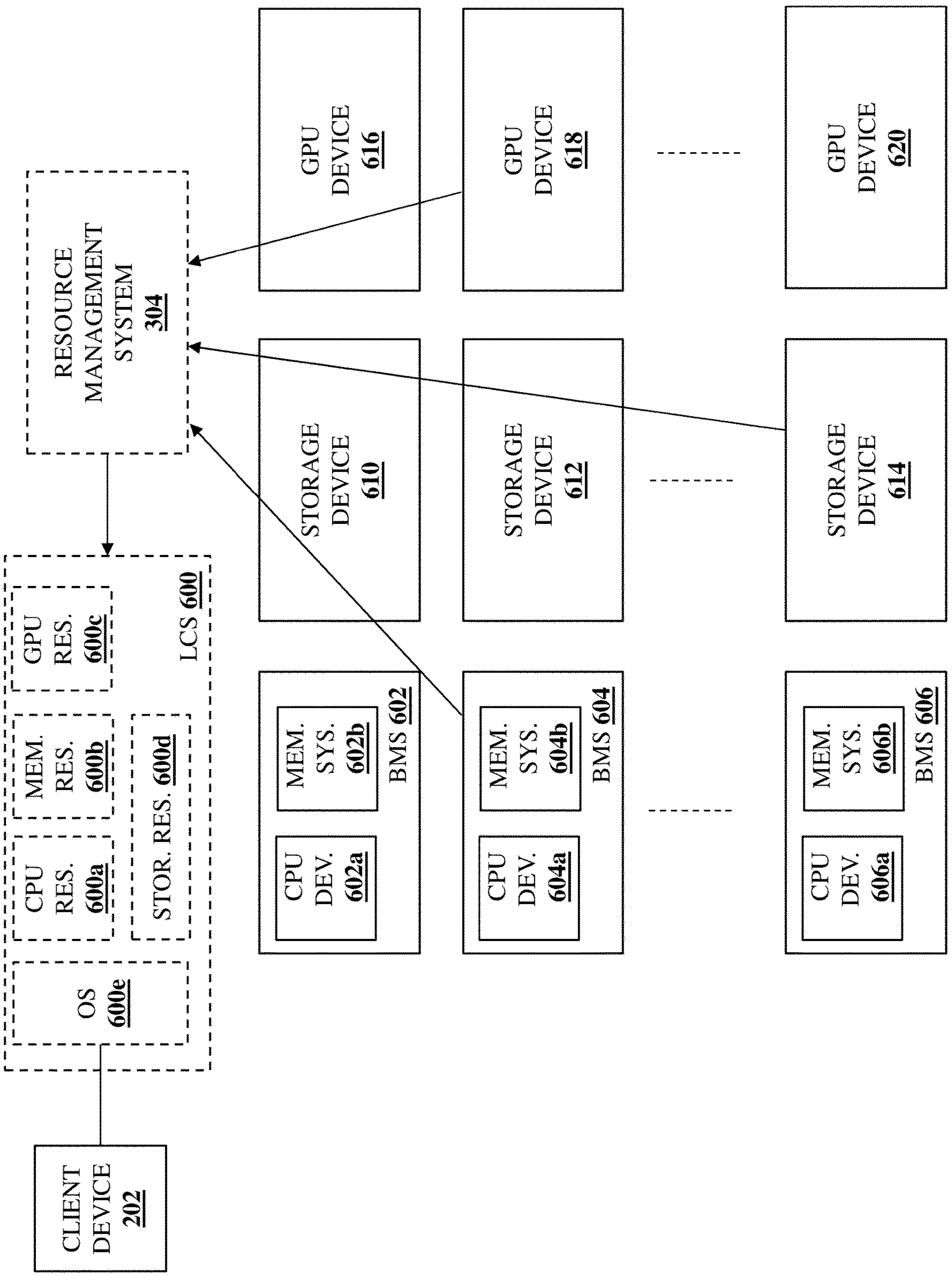
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor (e.g., an AMD x86 processor), an ARM processor, and/or other processing systems known in the art, along with a memory system that stores instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* may include resource devices 404*a*-404*c* provided by a Graphics Processing Unit (GPU) device 616, a GPU device 618, and up to a GPU device 620, which one of skill in the art in possession of the present disclosure will appreciate may be enabled via the use of Compute eXpress Link (CXL)-enabled GPU device sharing).

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 618 to provide the LCS 600 with GPU resources 600*c*. As illustrated in the specific example in FIG.

6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources in virtual resource systems like those described above. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 functionally appear to be the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" that expresses the workload intent of the workload, and the resource management system 304 may then compose an LCS by allocating resources that define that LCS and that satisfy the requirements expressed in its workload intent, and present that LCS to the user such that the user interacts with those resources in same manner as they would interact with a physical system at their location having those same resources.

Figure 7:
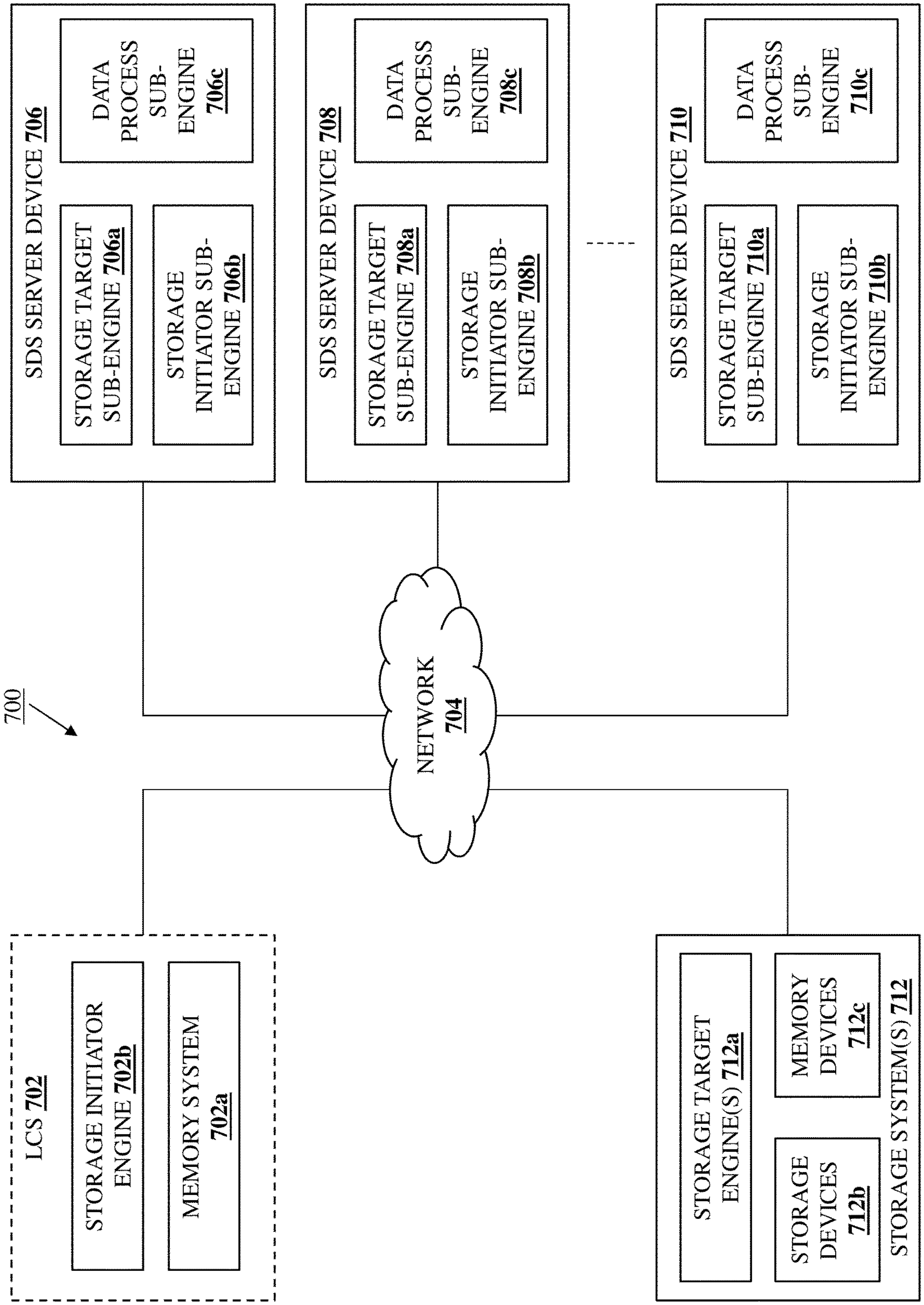
FIG. 7 is a schematic view illustrating an embodiment of the LCS provisioning system of FIG. 2 that may be used to provide the SDS-enabled disaggregated infrastructure direct I/O execution system of the present disclosure.

Referring now to FIG. 7, an embodiment of an LCS provisioning system 700 (or a portion thereof) is illustrated that may be used to provide the SDS-enabled disaggregated infrastructure direct I/O execution system of the present disclosure for use in provisioning LCSs to client devices. As will be appreciated by one of skill in the art in possession of the present disclosure, the LCS provisioning system 700 provides an example of just some of the physical and/or virtual components that are used to provide an LCS to a client device similarly as described above, with some of the physical and/or virtual components that are used to provide that LCS to the client device omitted for clarity of illustration and discussion. Furthermore, while described as being implemented in an LCS provisioning system, one of skill in the art in possession of the present disclosure will appreciate how the SDS-enabled disaggregated infrastructure direct I/O execution system of the present disclosure may be utilized with physical servers or other physical computing systems, logical servers or other logical computing systems, and/or a variety of other computing systems while remaining within the scope of the present disclosure.

In the illustrated embodiment, the LCS provisioning system 700 includes an LCS 702 that may be provided for any of the client device(s) 202 discussed above with reference to FIG. 2 using the techniques described above (e.g., based on the "manifest" expressing the workload intent of the workload that LCS 702 will perform), but that may be replaced with the physical servers or other physical computing systems, logical servers or other logical computing systems, and/or other computing systems as described above while remaining within the scope of the present disclosure. In the illustrated embodiment, the LCS 702 is provided using an LCS memory system 702*a*. In the illustrated embodiment, one or more LCS memory devices in the LCS memory system 702*a* may include instructions that, when executed by an LCS processing system providing the LCS 702 (not illustrated, but which may be provided by the processor 102 discussed above with reference to FIG. 1), may cause that LCS processing system to provide a storage initiator engine 702*b* that is configured to perform the functionality of the LCS storage initiator engines and/or LCSs discussed below. In an embodiment, the storage initiator engine 702*b* may be included in a storage client provided on the SCP devices, DPUs, and/or other hardware described above that is used to provide the LCS 702, although one of skill in the art in possession of the present disclosure will appreciate how the storage initiator engine 702*b* may be included in a storage client provided in an operating system or other software utilized with the LCS 702 while remaining within the scope of the present disclosure as well.

As will be appreciated by one of skill in the art, the specific examples provided herein use the terms "target" and "initiator", which are conventionally utilized in Small Computer System Interface (SCSI) technology, with NVMe technology for clarity of discussion. As such, one of skill in the art in possession of the present disclosure will appreciate how the "storage targets" described herein may include NVMe controllers, while the "storage initiators" described herein may include NVMe hosts. As such, in a specific example, the storage initiator engine 702*b* in the LCS 702 may be configured to provide a Non-Volatile Memory express (NVMe) "initiator" such as, for example, an NVMe over Fabrics (NVMe-oF) initiator that is described in the specific examples below as being provided by an NVMe/Remote Direct Memory Access (RDMA) initiator. However, while illustrated and described as being provided by particular storage initiators, one of skill in the art in possession of the present disclosure will appreciate how the functionality of the LCS 702 discussed below may be provided in a variety of manners while remaining within the scope of the present disclosure as well.

In the illustrated embodiment, the LCS 702 is coupled to a network 704 (e.g., the network 204 discussed above with reference to FIG. 2) that one of skill in the art in possession of the present disclosure will recognize may be provided by a relatively high-speed Transport Control Protocol (TCP) network and/or other high-speed networks known in the art. Furthermore, the LCS provisioning system 700 includes an SDS system that is coupled to the LCS 702 via the network 704, and that may include one or more SDS subsystems that are provided in the illustrated embodiment by SDS server devices 706, 708, and up to 710 (which one of skill in the art in possession of the present disclosure will appreciate may be provided by any number and/or combination of the resource systems and resource devices illustrated and discussed above with reference to FIGS. 3 and 4). As will be appreciated by one of skill in the art in possession of the present disclosure, the SDS system of the present disclosure may include one or more SDS subsystems that each include one or more SDS server devices, with each SDS server device included in one of the SDS subsystems.

As illustrated, the SDS server device 706 may include an SDS processing system (not illustrated, but which may be similar to the processor 102 discussed above with reference to FIG. 1) and an SDS memory system (not illustrated, but which may be similar to the memory 114 discussed above with reference to FIG. 1) that includes instruction that, when executed by the SDS processing system, cause the SDS processing system to provide an SDS engine that, in the illustrated embodiment, includes a storage target sub-engine 706*a*, a storage initiator sub-engine 706*b*, and a data process sub-engine 706*c*. As discussed above, the specific examples provided herein use the terms "target" and "initiator" that are conventionally utilized in Small Computer System Interface (SCSI) technology with NVMe technology for clarity of discussion, and thus one of skill in the art in possession of the present disclosure will appreciate how the "storage targets" described herein may include NVMe controllers, while the "storage initiators" described herein may include NVMe hosts.

Thus, in an embodiment, the storage target sub-engine 706*a* in the SDS server device 706 may be configured to provide an NVMe "target" such as, for example, an NVMe-oF target that is described in the specific examples below as being provided by an NVMe/RDMA target. Similarly, the storage initiator sub-engine 706*b* in the SDS server device 706 may be configured to provide an NVMe "initiator" such as, for example, an NVMe-oF initiator that is described in the specific examples below as being provided by an NVMe/RDMA initiator. Furthermore, the data process sub-engine 706*c* may be configured to perform the I/O command translation operations described below, as well any other operations that one of skill in the art in possession of the present disclosure would recognize as enabling the functionality discussed below.

As illustrated, the SDS server device 708 may include SDS processing system (not illustrated, but which may be similar to the processor 102 discussed above with reference to FIG. 1) and an SDS memory system (not illustrated, but which may be similar to the memory 114 discussed above with reference to FIG. 1) that includes instruction that, when executed by the SDS processing system, cause the SDS processing system to provide an SDS engine that, in the illustrated embodiment, includes a storage target sub-engine 708*a*, a storage initiator sub-engine 708*b*, and a data process sub-engine 708*c*. In an embodiment, the storage target sub-engine 708*a* in the SDS server device 708 may be configured to provide an NVMe target such as, for example, an NVMe-oF target that is described in the specific examples below as being provided by an NVMe/RDMA target. Similarly, the storage initiator sub-engine 708*b* in the SDS server device 708 may be configured to provide an NVMe initiator such as, for example, an NVMe-oF initiator that is described in the specific examples below as being provided by an NVMe/RDMA initiator. Furthermore, the data process sub-engine 708*c* may be configured to perform the I/O command translation operations described below, as well any other operations that one of skill in the art in possession of the present disclosure would recognize as enabling the functionality discussed below.

As illustrated, the SDS server device 710 may include an SDS processing system (not illustrated, but which may be similar to the processor 102 discussed above with reference to FIG. 1) and an SDS memory system (not illustrated, but which may be similar to the memory 114 discussed above with reference to FIG. 1) that includes instruction that, when executed by the SDS processing system, cause the SDS processing system to provide an SDS engine that, in the illustrated embodiment, includes a storage target sub-engine 710*a*, a storage initiator sub-engine 710*b*, and a data process sub-engine 710*c*. In an embodiment, the storage target sub-engine 710*a* in the SDS server device 710 may be configured to provide an NVMe target such as, for example, an NVMe-oF target that is described in the specific examples below as being provided by an NVMe/RDMA target. Similarly, the storage initiator sub-engine 710*b* in the SDS server device 710 may be configured to provide an NVMe initiator such as, for example, an NVMe-oF initiator that is described in the specific examples below as being provided by an NVMe/RDMA initiator. Furthermore, the data process sub-engine 710*c* may be configured to perform the I/O command translation operations described below, as well any other operations that one of skill in the art in possession of the present disclosure would recognize as enabling the functionality discussed below.

The LCS provisioning system 700 also includes one or more storage systems 712 that are coupled to the LCS 702 and the SDS server devices 706-710 via the network 704. For example, one of skill in the art in possession of the present disclosure will appreciate how SDS systems typically provide a pair of storage systems that allow for data stored in a "primary" storage system to be mirrored to a "secondary" storage system in order to ensure access to that data in the event either of the "primary" or "secondary" storage systems fail or otherwise become unavailable. As such, a specific example of the storage system(s) 712 may include a pair of storage systems, and while not described in detail below, one of skill in the art in possession of the present disclosure will appreciate how redundancy for any data stored in the storage system(s) 712 may be provided in a variety of manners while remaining within the scope of the present disclosure (e.g., via a single storage system 712 using Redundant Array of Independent Disk (RAID) techniques).

As illustrated, the storage system(s) 712 may include a storage processing system (not illustrated, but which may be similar to the processor 102 discussed above with reference to FIG. 1) and a storage memory system (not illustrated, but which may be similar to the memory 114 discussed above with reference to FIG. 1) that includes instruction that, when executed by the storage processing system, cause the storage processing system to provide storage target engine(s) 712*a* (e.g., a respective storage target engine 712*a* in each of the storage system(s) 712). In an embodiment, each of the storage target engine(s) 712*a* in the storage system(s) 712 may be configured to provide an NVMe target such as, for example, an NVMe-oF target that is described in the specific examples below as being provided by an NVMe/RDMA target. Furthermore, the storage system(s) 712 may also include a plurality of storage devices 712*b* and a plurality of persistent memory devices 712*c* that, as discussed below, may be configured to provide for the persistent storage of data utilized by the LCS 702.

To provide a specific example, the storage system(s) 712 may be provided by a "Bunch of Flash" (BOF) storage system (e.g., Just a Bunch of Flash (JBOF) storage system, an Ethernet Bunch of Flash (EBOF) storage system, etc.), with the storage devices 712*b* provided by NVMe storage devices and the persistent memory devices 712*c* provided by flash memory devices and/or other persistent memory devices that would be apparent to one of skill in the art in possession of the present disclosure. However, while specific storage system(s) 712 have been described, one of skill in the art in possession of the present disclosure will appreciate how a variety of storage systems will fall within the scope of the present disclosure as well.

As will be appreciated by one of skill in the art in possession of the present disclosure, any of the SDS server devices 706-710 (e.g., the SDS server device 706 in the specific examples provided below) and the storage system(s) 712 may be utilized to provide SDS storage resources for the LCS 702. For example, any of the client devices 202 discussed above with reference to FIG. 2 may request the provisioning of the LCS 702 similarly as described above, that that request may be satisfied by provisioning of the LCS 702 using SDS storage resources. As such, the SDS server devices 706, 708, and/or 710 may be configured to provide the SDS storage functionality discussed below using the storage system(s) 712 (e.g., with storage traffic from the LCS 702 being transmitted by the storage initiator engine 702*b* (e.g., in an SCP device providing that LCS 702) to the SDS server device(s) 706, 708, and/or 710 for storage in the storage system(s) 712). However, while a specific LCS provisioning system 700 has been illustrated and described, one of skill in the art in possession of the present disclosure will recognize that the SDS-enabled disaggregated infrastructure direct I/O execution system of the present disclosure may include a variety of components and component configurations while remaining within the scope of the present disclosure as well.

Figure 8:
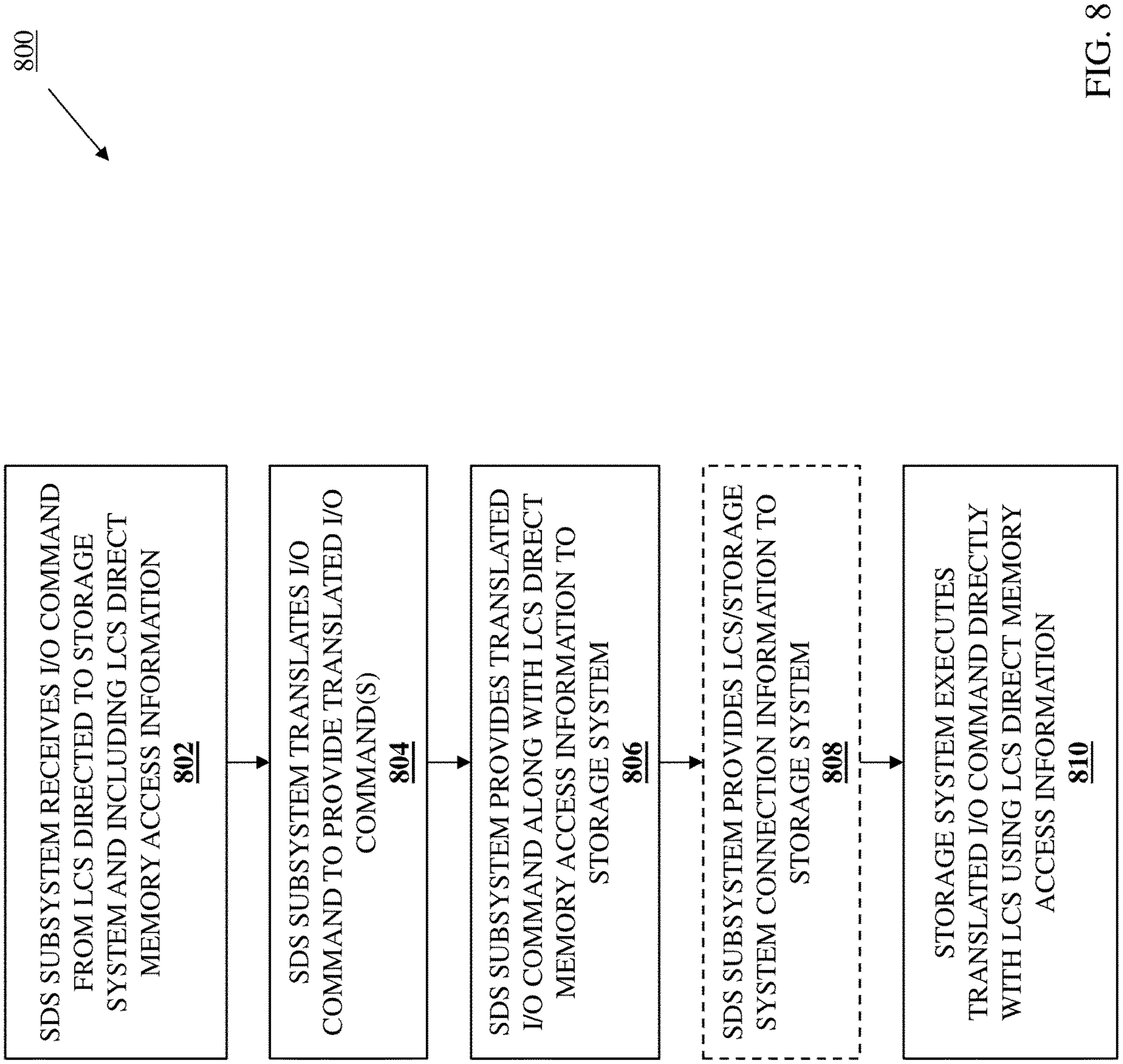
FIG. 8 is a flow chart illustrating an embodiment of a method for SDS-enabled direct I/O execution in a disaggregated infrastructure.

Referring now to FIG. 8, an embodiment of a method 800 for SDS-enabled direct I/O execution in a disaggregated infrastructure is illustrated. As discussed below, the systems and methods of the present disclosure provide for SDS-enablement of the direct execution of I/O commands in a disaggregated infrastructure between an LCS and a storage system. For example, the SDS-enabled disaggregated infrastructure direct I/O execution system of the present disclosure may include an SDS subsystem that is coupled to each of an LCS and a storage system. The SDS subsystem receives an I/O command from the LCS that is directed to the storage system and that includes LCS direct memory access information. The SDS subsystem translates the I/O command to provide a translated I/O command. The SDS subsystem then provides the translated I/O command along with the LCS direct memory access information to the storage system. The storage system may then execute the translated I/O command directly with the LCS using the LCS direct memory access information. As such, the conventional use of processing resources, memory resources, and network bandwidth for data as it moves through multiple "hops" between an LCS and a storage system during execution of an I/O command in a disaggregated infrastructure is eliminated.

As will be appreciated by one of skill in the art in possession of the present disclosure, the simplified examples provided below illustrate a situation in which an I/O command results in a "one-to-one" I/O command translation. However, one of skill in the art in possession of the present disclosure will appreciate how I/O commands may require a "one-to-many" I/O command translation such as, for example, when a read I/O command crosses a boundary in which its mapping changes to different storage devices in the storage system(s) 712, or when a write I/O command requires mirroring or other redundancy operations to protect against failure or other unavailability of a storage device in the storage system(s) 712, or a failure of one of the storage system(s) 712 (e.g., via a copy of its data on another of the storage system(s) 712).

With reference to FIGS. 9A, 9B, 9C, 9D, and 9E, an example of the conventional execution of I/O commands in a disaggregated infrastructure using the LCS provisioning system 700 of FIG. 7 is illustrated and described for comparison to the SDS-enabled disaggregated infrastructure direct I/O execution operations of the present disclosure, and while the SDS server device 706 is described as operating to enable the conventional execution of the I/O command, one of skill in the art in possession of the present disclosure will appreciate how any of the SDS server devices 708-710 may enable the conventional execution of I/O commands in a similar manner as well.

Figure 9A:
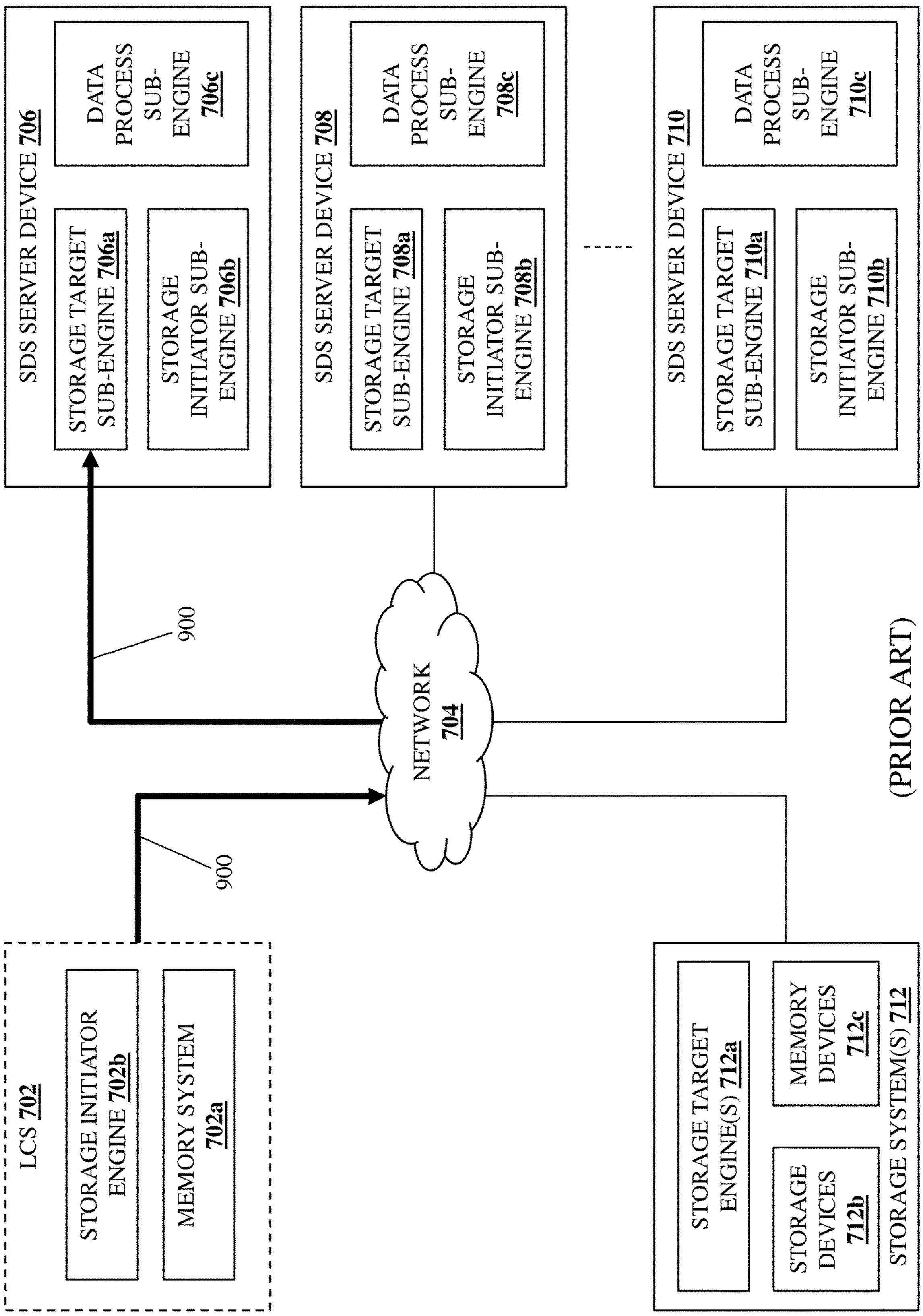
(PRIOR ART) FIG. 9A
FIG. 9A is a schematic view illustrating an embodiment of conventional operation of the LCS provisioning system of FIG. 7.

With reference to FIG. 9A, the LCS 702 and the SDS server device 706 may perform I/O operations 900 that include transmitting an I/O command request via the network 704 from the LCS 702 to the SDS server device 706. For example, for a read I/O command initiated by the LCS 702, the I/O operations 900 may include the storage initiator engine 702b in the LCS 702 generating and transmitting an NVMe-oF read request via the network 704 to the storage target sub-engine 706a in the SDS server device 706, with that NVMe-oF read request identifying logical storage space(s) that corresponds to physical storage space(s) in the storage system(s) 712 at which data is stored and should be read.

In another example, for a write I/O command initiated by the LCS 702, the I/O operations 900 may include the storage initiator engine 702b in the LCS 702 generating and transmitting an NVMe-oF write request to the storage target sub-engine 706a in the SDS server device 706, with that NVMe-oF write request identifying data in the memory system 702a of the LCS 702 for storage in the storage system(s) 712. Furthermore, one of skill in the art in possession of the present disclosure will appreciate how that NVMe-oF write request may identify logical storage space(s) that corresponds to physical storage space(s) in the storage system(s) 712 at which that data should be stored in the event that data updates data that was previously stored in the storage system(s) 712. In response to receiving the NVMe-oF write request, the storage target sub-engine 706a may perform an RDMA read operation to read the data identified in the NVMe-oF write request from the memory system 702a in the LCS 702, and may write that data to a memory system (not illustrated) in the SDS server device 706.

Figure 9B:
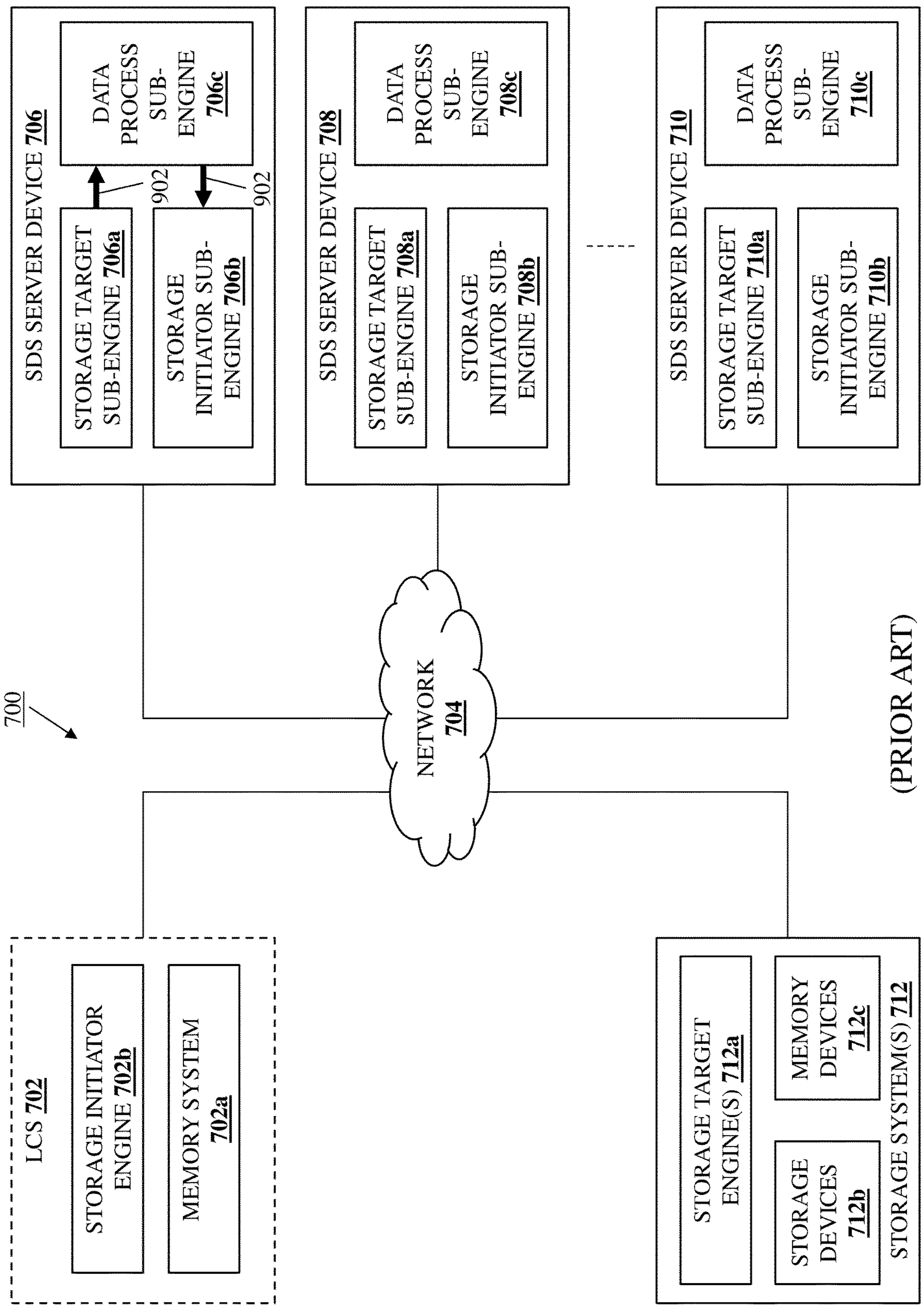
(PRIOR ART) FIG. 9B
FIG. 9B is a schematic view illustrating an embodiment of conventional operation of the LCS provisioning system of FIG. 7.

With reference to FIG. 9B, the SDS server device 706 may then perform I/O operations 902. As illustrated, performing the I/O operations 902 may include the storage target sub-engine 706a in the SDS server device 706 generating a first I/O request that corresponds to the I/O command received from the LCS 702 and transmitting that first I/O request to the data process sub-engine 706c, the data process sub-engine 706c performing logical-to-physical mapping operations to translate any logical storage space(s) that were identified in the I/O command provided by the LCS 702 and received in the first I/O request from the storage target sub-engine 706a to physical storage space(s) in the storage system(s) 712, and the data process sub-engine 706c generating a second I/O request and transmitting that second I/O request to the storage initiator sub-engine 706b in the SDS server device 706.

For example, for a read I/O command initiated by the LCS 702, the I/O operations 902 may include the storage target sub-engine 706a in the SDS server device 706 generating a first read I/O request that corresponds to the read I/O command received from the LCS 702 and transmitting that first read I/O request to the data process sub-engine 706c, the data process sub-engine 706c performing logical-to-physical mapping operations to translate the logical storage space(s) that were identified in the read I/O command provided by the LCS 702 and received in the first read I/O request from the storage target sub-engine 706a to physical storage space(s) in the storage system(s) 712, and the data process sub-engine 706c generating a second read I/O request that identifies the physical storage space(s) in the storage system(s) 712 and transmitting that second read I/O request to the storage initiator sub-engine 706b in the SDS server device 706.

In another example, for a write I/O command initiated by the LCS 702, the I/O operations 902 may include the storage target sub-engine 706a in the SDS server device 706 generating a first write I/O request that corresponds to the write I/O command received from the LCS 702 and transmitting that first write I/O request to the data process sub-engine 706c, the data process sub-engine 706c performing logical-to-physical mapping operations to translate any logical storage space(s) that were identified in the write I/O command provided by the LCS 702 and received in the first write I/O request from the storage target sub-engine 706a (e.g., as part of the data update situation described above) to physical storage space(s) in the storage system(s) 712, and the data process sub-engine 706c generating a second write I/O request that may identify the physical storage space(s) in the storage system(s) 712 (e.g., as part of the data update situation described above) and transmitting that second write I/O request to the storage initiator sub-engine 706b in the SDS server device 706.

Figure 9C:
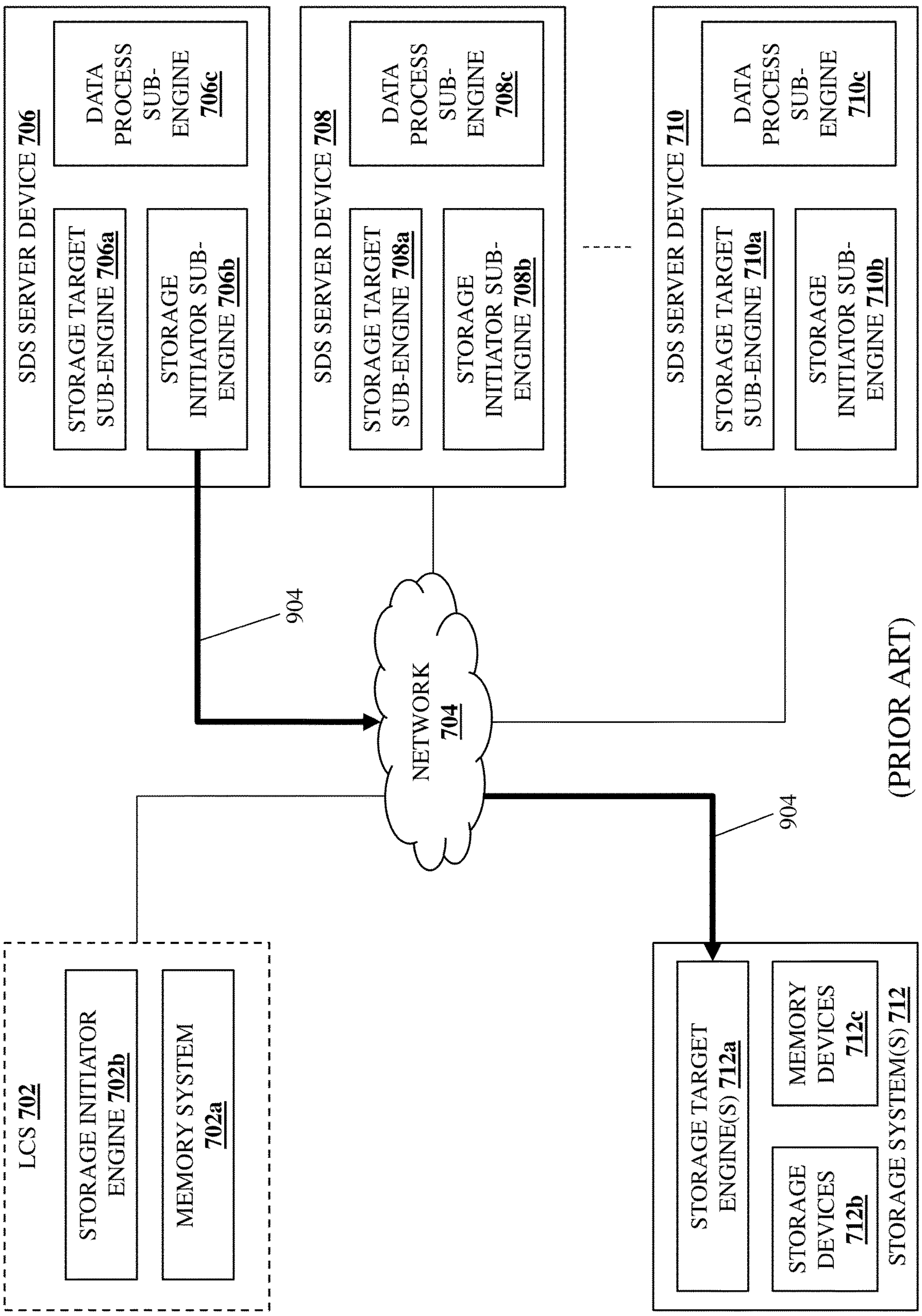
(PRIOR ART) FIG. 9C
FIG. 9C is a schematic view illustrating an embodiment of conventional operation of the LCS provisioning system of FIG. 7.

With reference to FIG. 9C, the SDS server device 706 and the storage system(s) 712 may perform I/O operations 904 that include transmitting an I/O command request via the network 704 from the SDS server device 706 to the storage system(s) 712. For example, for a read I/O command initiated by the LCS 702, the I/O operations 904 may include the storage initiator engine 706b in the SDS server device 706 generating and transmitting an NVMe-OF read request to the storage target engine(s) 712a in the storage system(s) 712 that may identify physical storage space(s) in the storage system(s) 712 at which data is stored and should be read.

In another example, for a write I/O command initiated by the LCS 702, the I/O operations 904 may include the storage initiator sub-engine 706b in the SDS server device 706 generating and transmitting an NVMe-oF write request to the storage target engine(s) 712a in the storage system(s) 712 that may identify the data that was received from the LCS 702 and written to the memory system (not illustrated) of the SDS server device 706. Furthermore, similarly as discussed above, that NVMe-oF write request may identify physical storage space(s) in the storage system(s) 712 at which that data should be stored (e.g., in the event that data updates data that was previously stored in the storage system(s) 712). In response to receiving the NVMe-oF write request, the storage target engine(s) 712a may perform an RDMA read operation to read the data identified in the NVMe-oF write request from the memory system (not illustrated) in the SDS server device 706, and may either write that data to a volatile memory device(s) in the storage target engine(s) 712a, or write that data directly to the persistent memory devices 712c as described below.

Figure 9D:
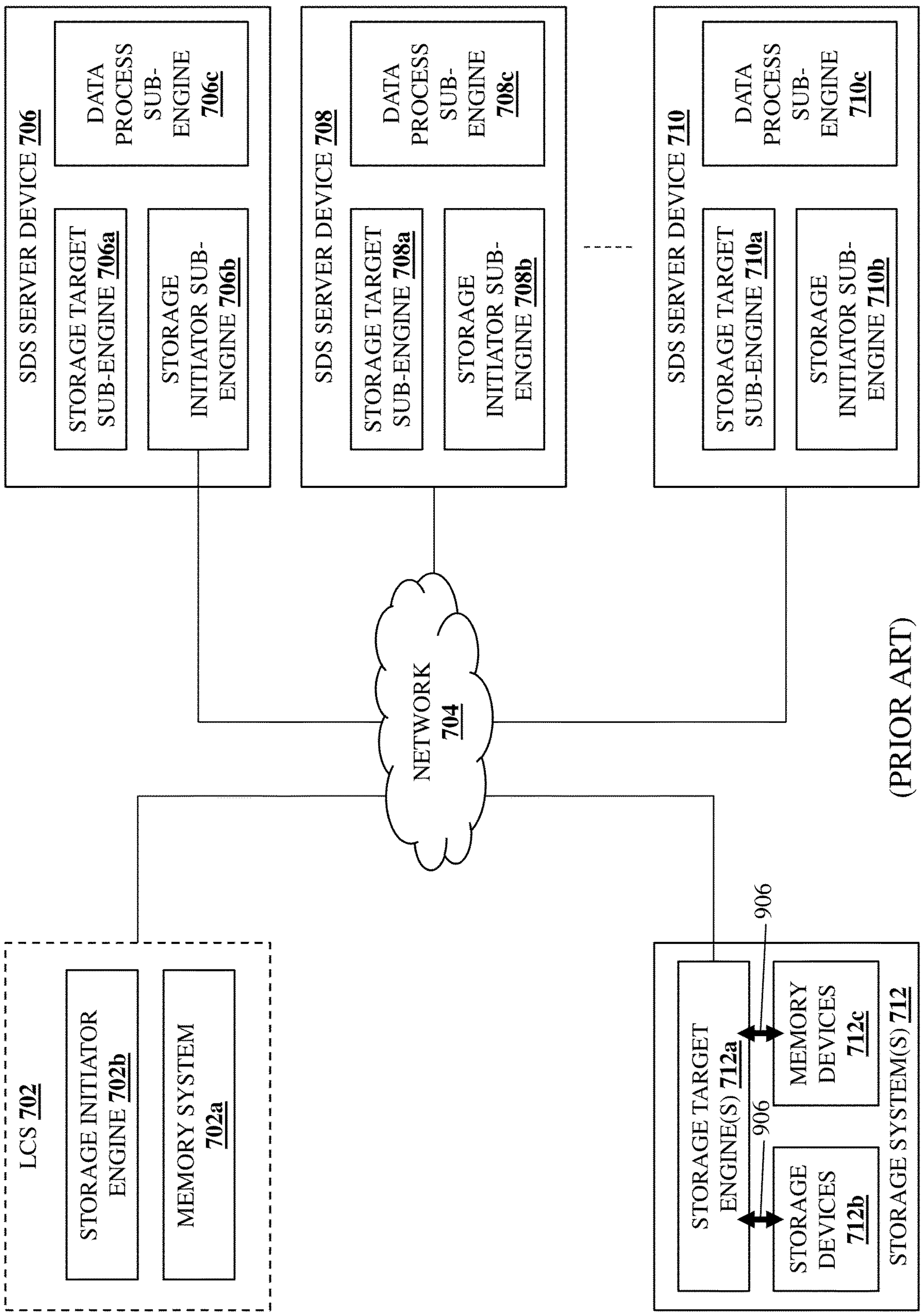
(PRIOR ART) FIG. 9D
FIG. 9D is a schematic view illustrating an embodiment of conventional operation of the LCS provisioning system of FIG. 7.

With reference to FIG. 9D, the storage system(s) 712 may then perform I/O operations 906. In the illustrated embodiment, the I/O operations 906 include the storage target engine(s) 712a in the storage system(s) 712 performing one or more data operations using the storage devices 712b and/or the persistent memory devices 712c. For example, for a read I/O command initiated by the LCS 702, the I/O operations 906 may include the storage target engine(s) 712a subsequently reading that data from the persistent memory devices 712c, or generating and transmitting a read I/O request to the storage devices 712b that may identify the physical storage space(s) in the storage system(s) 712 at which data is stored and should be read, and the storage devices 712b reading that data from that physical storage space in the storage system(s) 712, writing that data to volatile memory device(s) in the storage target engine(s) 712a, and generating and transmitting a read response to the storage target engine(s) 712a.

In another example, for a write I/O command initiated by the LCS 702, the I/O operations 906 may include the storage target engine(s) 712a writing data to the persistent memory devices 712c as described above, or generating and transmitting a write I/O request to the storage devices 712b, and the storage devices **712*b* reading that data from the volatile memory device(s) in the storage target engine(s) 712*a* and storing that data, and generating and transmitting a write response to the storage target engine(s) 712*a*, and one of skill in the art in possession of the present disclosure will appreciate how the persistent memory devices 712*c* or the storage devices 712*b* may store that data in the physical storage space(s) in the storage system(s) 712** that is identified in the write I/O request (e.g., as part of the data update situation described above).

Figure 9E:
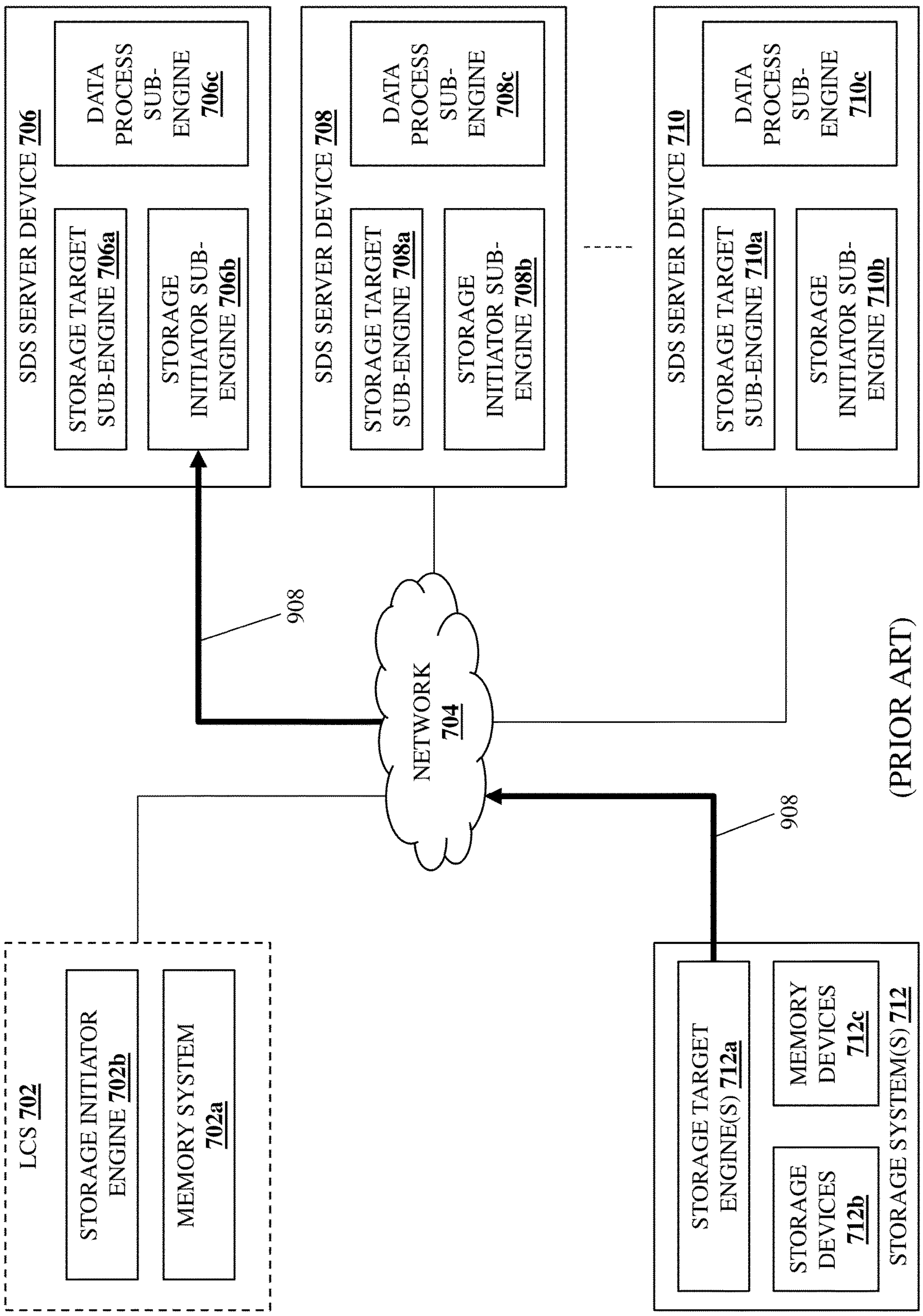
(PRIOR ART) FIG. 9E
FIG. 9E is a schematic view illustrating an embodiment of conventional operation of the LCS provisioning system of FIG. 7.

With reference to FIG. 9E, the storage system(s) 712 and the SDS server device 706 may perform I/O operations 908 that include transmitting an I/O command response via the network 704 from the storage system(s) 712 to the SDS server device 706. For example, for a read I/O command initiated by the LCS 702, the I/O operations 908 may include the storage target engine(s) **712*a* in the storage system(s) 712 performing an RDMA write operation to write data from the persistent memory devices 712*c*, or write the data that was stored in the volatile memory device(s) memory devices 712*c* of the storage target engine(s) 712*a* as discussed above, to the memory system (not illustrated) in the SDS server device 706, and transmitting an NVMe-oF read response to the storage initiator sub-engine 706*b* in the SDS server device 706 that confirms the reading of the data from the storage system(s) 712 and the transfer of that data to the SDS server device 706. In another example, for a write I/O command initiated by the LCS 702, the I/O operations 908 may include the storage target engine(s) 712*a* in the storage system(s) 712 transmitting an NVMe-oF write response to the storage initiator sub-engine 706*b* in the SDS server device 706 that confirms the writing of the data that was provided by the LCS 702 in the write I/O command to the storage system(s) 712**.

Figure 9F:
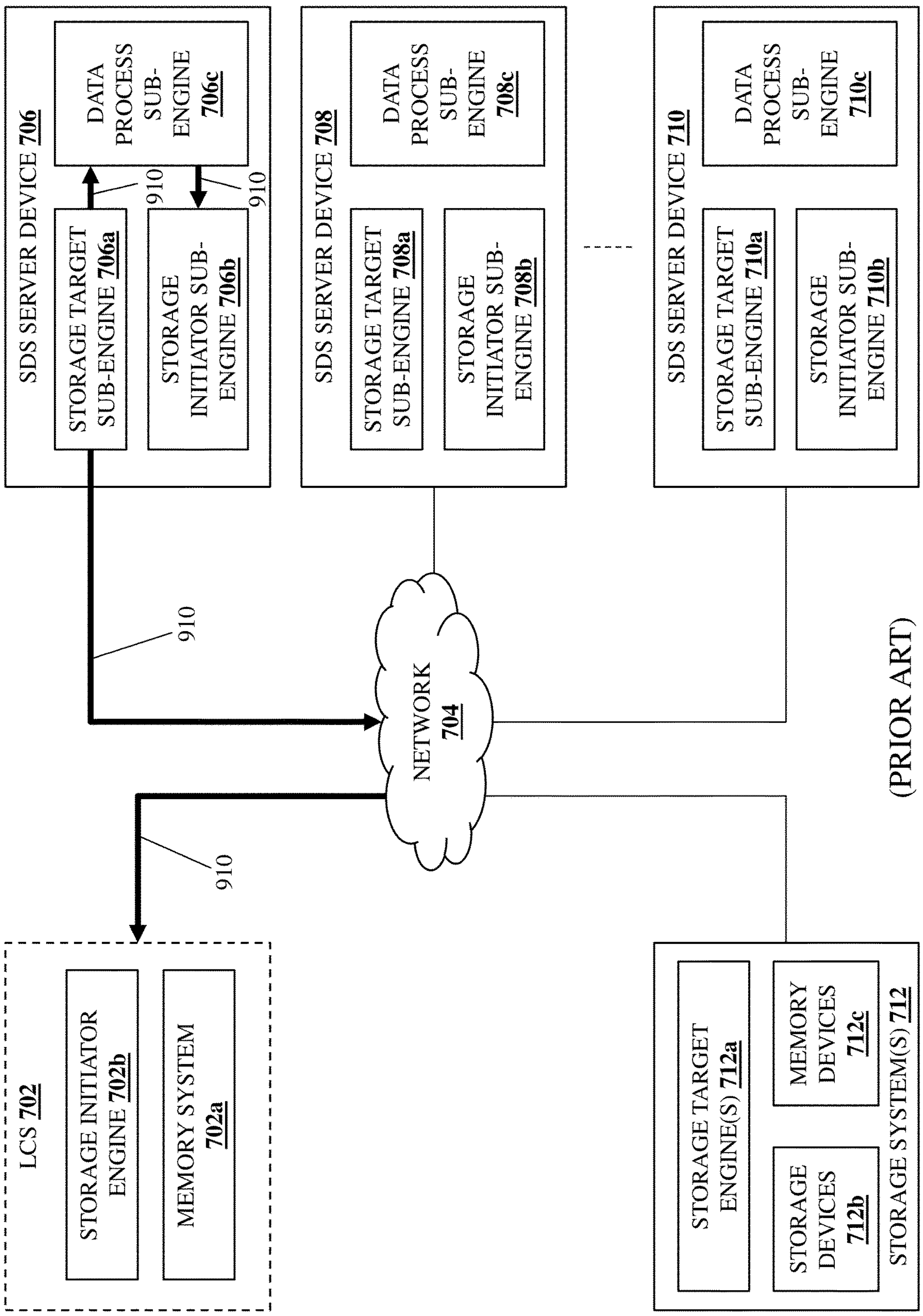
(PRIOR ART) FIG. 9F
FIG. 9F is a schematic view illustrating an embodiment of conventional operation of the LCS provisioning system of FIG. 7.

With reference to FIG. 9F, the SDS server device 706 and the LCS 702 then may perform I/O operations 910 that may include the storage initiator sub-engine **706*a* in the SDS server device 706 transmitting an I/O command response to the data process sub-engine 706*c* in the SDS server device 706, the data process sub-engine 706*c* transmitting an I/O command response to the storage target sub-engine 706*a* in the SDS server device 706, and the storage target sub-engine 706*a* transmitting an I/O response via the network 704 to the LCS 702. For example, for a read I/O command initiated by the LCS 702, the I/O operations 910 may include the storage initiator sub-engine 706*a* transmitting a read response to the data process sub-engine 706*c*, the data process sub-engine 706*c* transmitting a read response to the storage target sub-engine 706*a*, and the storage target sub-engine 706*a* performing an RDMA write operation to write the data that was stored in the memory system (not illustrated) of the SDS server device 706 as part of the I/O operations 908 to the memory system 702*a* in the LCS 702, and transmitting an NVMe-oF read response to the storage initiator engine 702*b* in the LCS 702 that confirms the reading of the data from the storage system(s) 712 and the writing of that data to the memory system 702*a* in the LCS 702**.

In another example, for a write I/O command initiated by the LCS 702, the I/O operations 910 may include the storage initiator sub-engine **706*a* in the SDS server device 706 transmitting a write response to the data process sub-engine 706*c*, the data process sub-engine 706*c* transmitting a write response to the storage target sub-engine 706*a*, and the storage target sub-engine 706*a* transmitting an NVMe-oF write response to the storage initiator engine 702*b* in the LCS 702 that confirms the writing of the data that was provided by the LCS 702 in the write I/O command to the storage system(s) 712. Similarly as discussed above, while the simplified examples herein described single I/O commands and corresponding responses, multiple I/O commands and corresponding responses will fall within the scope of the present disclosure as well. For example, when a write I/O command from the LCS 702 results in multiple write I/O operations to the storage devices 712*b* in the storage system(s) 712 (e.g., to provide the data mirroring as described above), the data process sub-engine 706*c* in the SDS server device 706 may only transmit the write response discussed above to the LCS 702 after it has received the respective NVMe-oF write responses from the storage target engine(s) 712*a* in the storage system(s) 712** for each of those write I/O operations.

As such, the conventional execution of I/O commands in the disaggregated infrastructure described above operates to copy and store data in the SDS server device 706 that provides a "hop" between the LCS 702 and the storage system(s) 712, and one of skill in the art in possession of the present disclosure will appreciate that multiple "hops" similar to the SDS server device 706 described above may exist between an LCS and a storage system in a disaggregated infrastructure, and will require the use of processing resources, memory resources, and network bandwidth to forward and copy data at any of those "hops", resulting in the performance and resource utilization issues described above. As described below, the method 800 eliminates the copying and storage of data at "hops" between an LCS and a storage system in a disaggregated infrastructure, thus eliminating the need to use corresponding processing resources, memory resources, and network bandwidth, and improving the performance and resource utilization of the system.

As will be appreciated by one of skill in the art in possession of the present disclosure, during or prior to the method 800, the ability to provide the direct connection described below between the LCS 702 and the storage system(s) 712 may be discovered, and that direct connection may be established. For example, a control plane in the SDS system of the present disclosure may be configured to perform SDS storage cluster deployment operations that deploy an SDS storage cluster provided by the storage system(s) 712. As will be appreciated by one of skill in the art in possession of the present disclosure, that control plane may identify resource device capabilities and resource device connectivity during such SDS storage cluster deployment operations and, in response, may discover the direct RDMA connection capability between the LCS 702 and the storage system(s) 712, and establish a corresponding RDMA connection such that the direct RDMA I/O path is enabled between the LCS 702 and the storage system(s) 712 as described below, and one of skill in the art in possession of the present disclosure will appreciate how software configurations for the LCS 702, the SDS server devices 706-710, and the storage system(s) 712 may be updated to leverage that direct RDMA I/O path in the manner described below while remaining within the scope of the present disclosure.

Furthermore, while the SDS server device 706 is illustrated and described below as operating to enable the direct execution of the I/O command in the disaggregated infrastructure between the LCS 702 and the storage system(s) 712 according to the teachings of the present disclosure, one of skill in the art in possession of the present disclosure will appreciate how any of the SDS server devices 708-710 may enable the direct execution of I/O commands according to the teachings of the present disclosure in a similar manner while remaining within the scope of the present disclosure as well.

Figure 10A:
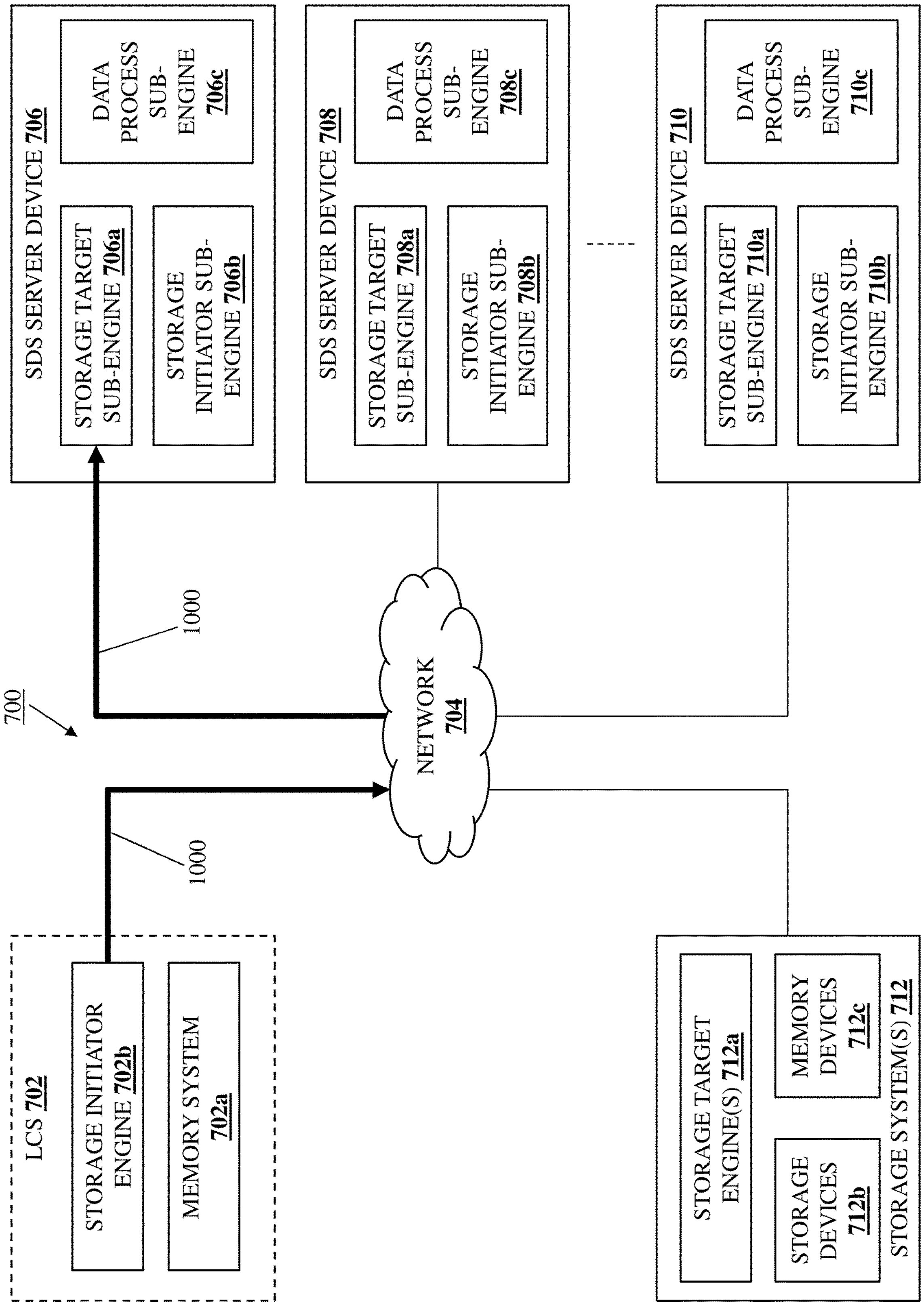
FIG. 10A is a schematic view illustrating an embodiment of the LCS provisioning system of FIG. 7 operating during the method of FIG. 8.

The method 800 begins at block 802 where an SDS subsystem receives an I/O command from an LCS that is directed to a storage system and that includes LCS direct memory access information. With reference to FIG. 10A, in an embodiment of block 802, the storage initiator engine 702*b* in the LCS 702 may perform I/O operations 1000 that include generating an I/O command request that includes LCS direct memory access information that identifies one or more data storage locations in the memory system 702*a* in the LCS 702, and transmitting that I/O command request via the network 704 to the storage target sub-engine 706*a* in the SDS server device 706. For example, the I/O command request generated and transmitted at block 802 may be a Non-Volatile Memory Express (NVMe) I/O request that includes Scatter Gather List (SGL) (i.e., an NVMe command used in NVMe-oF), and the LCS direct memory access information may be provided in the SGL by Remote Direct Memory Access (RDMA) memory buffer reference(s) to the memory system 702*a* in the LCS 702. However, while a specific I/O command request and LCS direct memory access information have been described, one of skill in the art in possession of the present disclosure will appreciate how a variety of I/O command requests and LCS direct memory access information will fall within the scope of the present disclosure as well.

For example, for a read I/O command initiated by the LCS 702, the I/O operations 1000 may include the storage initiator engine 702*b* in the LCS 702 generating and transmitting an NVMe-oF read request via the network 704 to the storage target sub-engine 706*a* in the SDS server device 706, with the NVMe-oF read request identifying logical storage space(s) that corresponds to physical storage space(s) in the storage system(s) 712 at which data is stored and should be read, and including an SGL having the RDMA memory buffer reference(s) to storage space in the memory system 702*a* of the LCS 702 in which that data should be stored.

In another example, for a write I/O command initiated by the LCS 702, the I/O operations 1000 may include the storage initiator engine 702*b* in the LCS 702 generating and transmitting an NVMe-oF write request via the network 704 to the storage target sub-engine 706*a* in the SDS server device 706, with the NVMe-OF write request including an SGL having the RDMA memory buffer reference(s) to storage space in the memory system 702*a* of the LCS 702 from which that data should be read. Similarly as described above, one of skill in the art in possession of the present disclosure will appreciate how that NVMe-oF write request may identify logical storage space(s) that corresponds to physical storage space(s) in the storage system(s) 712 at which that data should be stored (e.g., in the event that data updates data that was previously stored in the storage system(s) 712). As will be appreciated by one of skill in the art in possession of the present disclosure, the write I/O command transmitted from the LCS 702 to the SDS server device 706 will not result in the copying of the data that is the subject of that write I/O command from the LCS 702 to the SDS server device 706.

Figure 10B:
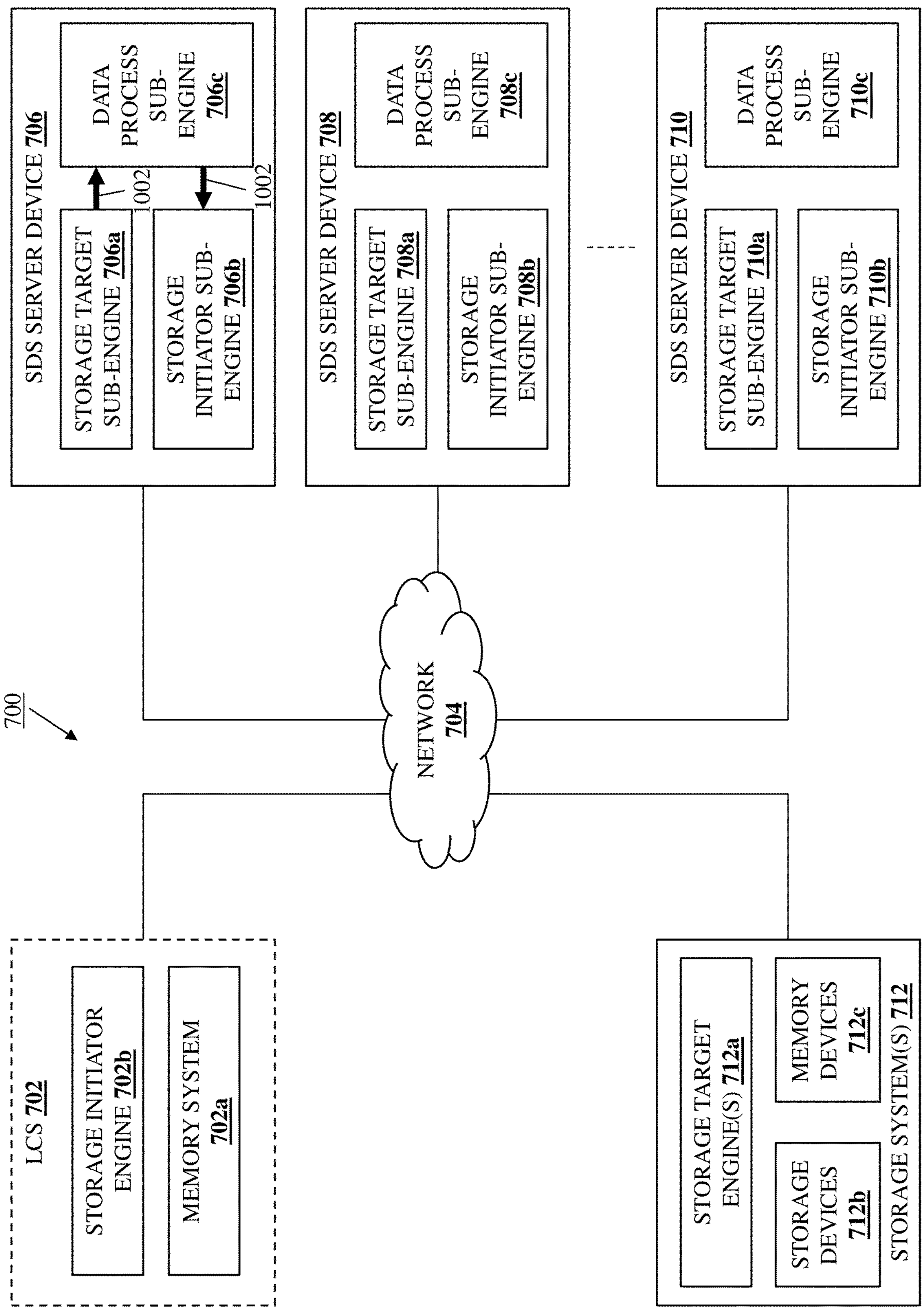
FIG. 10B is a schematic view illustrating an embodiment of the LCS provisioning system of FIG. 7 operating during the method of FIG. 8.

The method 800 then proceeds to block 804 where the SDS subsystem translates the I/O command to provide a translated I/O command(s). With reference to FIG. 10B, in an embodiment of block 804, the SDS server device 706 may then perform I/O operations 1002. For example, the I/O operations 1002 may include the storage target sub-engine 706*a* in the SDS server device 706 generating a first I/O request that corresponds to the I/O command received from the LCS 702 and transmitting that first I/O request to the data process sub-engine 706*c*, the data process sub-engine 706*c* performing logical-to-physical mapping operations to translate any logical storage space(s) that were identified in the I/O command provided by the LCS 702 and received in the first I/O request from the storage target sub-engine 706*a* (if present) to physical storage space(s) in the storage system(s) 712, and the data process sub-engine 706*c* generating a second I/O request and transmitting that second I/O request to the storage initiator sub-engine 706*b* in the SDS server device 706.

For example, for a read I/O command initiated by the LCS 702, the I/O operations 1002 may include the storage target sub-engine 706*a* in the SDS server device 706 generating a first read I/O request that corresponds to the read I/O command received from the LCS 702 and transmitting that first read I/O request to the data process sub-engine 706*c*, the data process sub-engine 706*c* performing logical-to-physical mapping operations to translate the logical storage space(s) that were identified in the read I/O command provided by the LCS 702 and received in the first read I/O request from the storage target sub-engine 706*a* to physical storage space(s) in the storage system(s) 712, and the data process sub-engine 706*c* generating a second read I/O request that identifies the physical storage space(s) in the storage system(s) 712 from which data should be read, and that includes the SGL having the RDMA memory buffer reference(s) to storage space in the memory system 702*a* of the LCS 702 to which that data should be written, and transmitting that second read I/O request to the storage initiator sub-engine 706*b* in the SDS server device 706.

In another example, for a write I/O command initiated by the LCS 702, the I/O operations 902 may include the storage target sub-engine 706*a* in the SDS server device 706 generating a first write I/O request that corresponds to the write I/O command received from the LCS 702 and transmitting that first write I/O request to the data process sub-engine 706*c*, the data process sub-engine 706*c* performing logical-to-physical mapping operations to translate any logical storage space(s) that were identified in the write I/O command provided by the LCS 702 and received in the first write I/O request from the storage target sub-engine 706*a* (e.g., in the data update situation described above) to physical storage space(s) in the storage system(s) 712 to which data should be written, and the data process sub-engine 706*c* generating a second write I/O request that may identify the physical storage space(s) in the storage system(s) 712 to which data should be written (e.g., in the data update situation described above) and that includes the SGL having the RDMA memory buffer reference(s) to storage space in the memory system 702*a* of the LCS 702 from which that data should be read, and transmitting that second write I/O request to the storage initiator sub-engine 706*b* in the SDS server device 706.

Figure 10C:
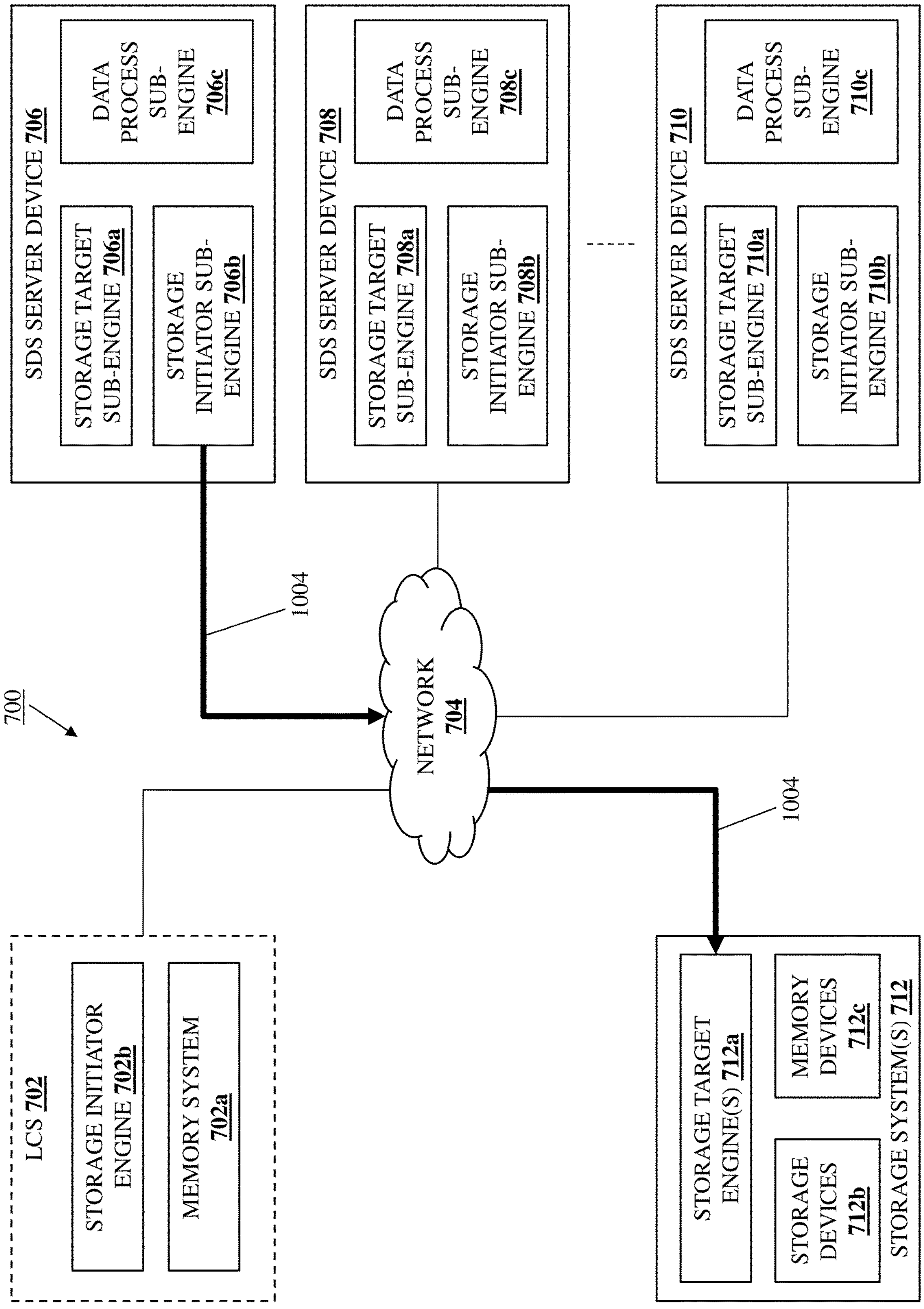
FIG. 10C is a schematic view illustrating an embodiment of the LCS provisioning system of FIG. 7 operating during the method of FIG. 8.

The method 800 then proceeds to block 806 where the SDS subsystem provides the translated I/O command along with the LCS direct memory access information to the storage system. With reference to FIG. 10C, in an embodiment of block 806, the storage initiator sub-engine 706*b* in the SDS server device 706 may perform I/O operations 1004 that include transmitting an I/O command request that includes the LCS direct memory access information via the network 704 to the storage target engine(s) 712*a* in the storage system(s) 712. For example, for a read I/O command initiated by the LCS 702, the I/O operations 1004 may include the storage initiator engine 706*b* in the SDS server device 706 generating and transmitting an NVMe-oF read request to the storage target engine(s) 712*a* in the storage system(s) 712 that may identify physical storage space(s) in the storage system(s) 712 at which data is stored and should be read, and that may include the SGL having the RDMA memory buffer reference(s) to storage space(s) in the memory system 702*a* of the LCS 702 to which data should be written.

In another example, for a write I/O command initiated by the LCS 702, the I/O operations 904 may include the storage initiator sub-engine 706*b* in the SDS server device 706 generating and transmitting an NVMe-oF write request to the storage target engine(s) 712*a* in the storage system(s) 712 that includes the SGL having the RDMA memory buffer reference(s) to storage space(s) in the memory system 702*a* of the LCS 702 from which data should be read. Furthermore, one of skill in the art in possession of the present disclosure will appreciate how that NVMe-oF write request may identify physical storage space(s) in the storage system(s) 712 at which that data should be written in the event that data updates data that was previously stored in the storage system(s) 712.

The method 800 may then proceed to optional block 808 where the SDS subsystem may provide LCS/storage system connection information to the storage system. In an embodiment, at block 808, the storage initiator sub-engine 706*b* in the SDS server device 706 may provide LCS/storage system connection information to the storage system(s) 712 along with the translated I/O command provided at block 806, and that LCS/storage system connection information may be configured to allow the storage system(s) 712 to directly connect to the LCS 702 as described in further detail below. For example, one of skill in the art in possession of the present disclosure will appreciate how the storage system(s) 712 may initially only be "aware" of the SDS server device 706, and thus the storage initiator sub-engine 706*b* may modify the RDMA memory buffer reference(s) in the SGL included in the NVMe-oF read request or NVMe-oF write request with LCS/storage system connection information to allow the storage system(s) 712 to directly connect to the LCS 702, may add LCS/storage system connection information to the NVMe-OF read request or NVMe-oF write request to allow the storage system(s) 712 to directly connect to the LCS 702 using the RDMA memory buffer reference(s) in the SGL included therein, and/or otherwise may provide the storage system(s) 712 with LCS/storage system connection information to allow the storage system(s) 712 to directly connect to the LCS 702.

Figure 10D:
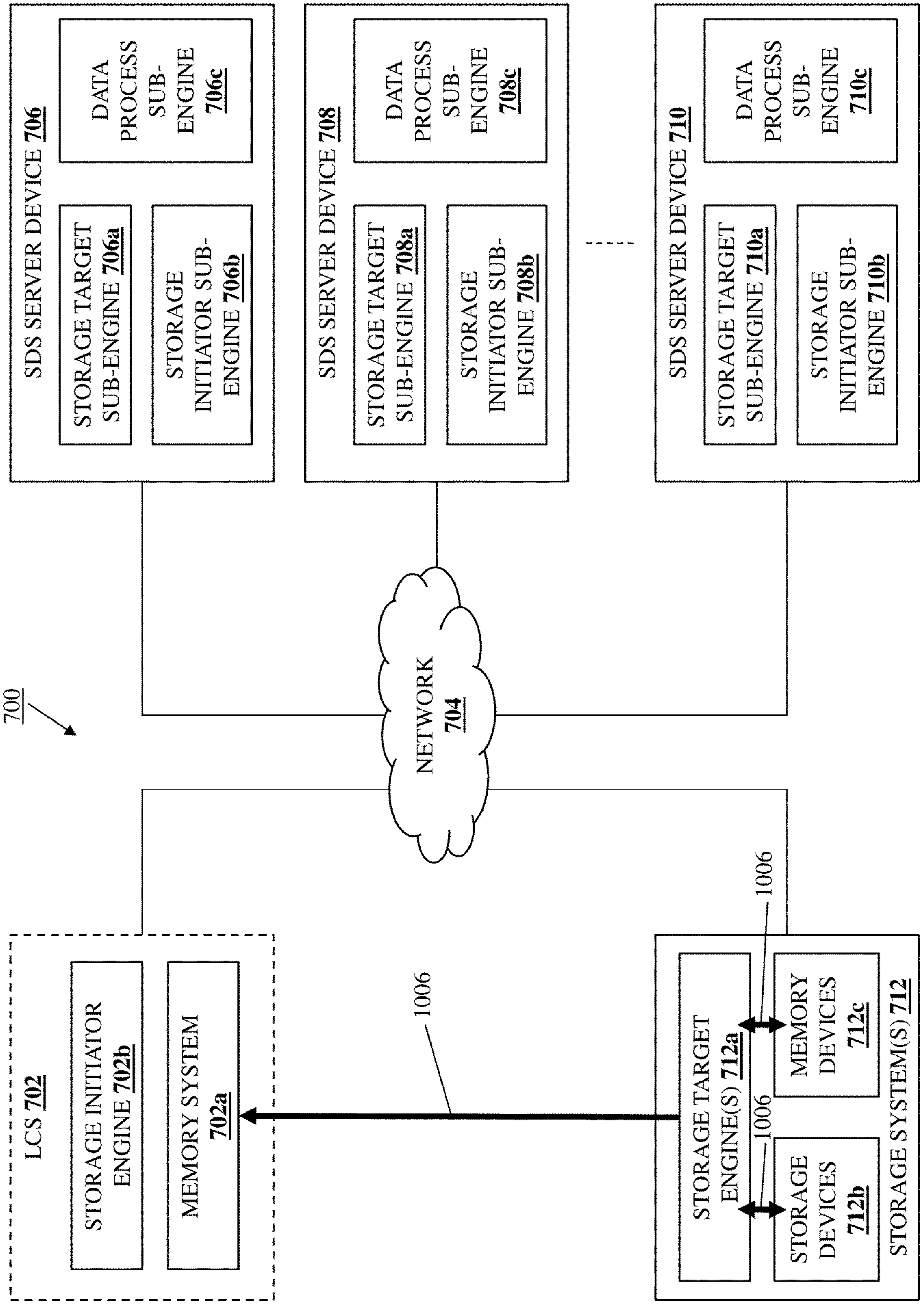
FIG. 10D is a schematic view illustrating an embodiment of the LCS provisioning system of FIG. 7 operating during the method of FIG. 8.

The method 800 then proceeds to block 810 where the storage system executes the translated I/O command directly with the LCS using the LCS direct memory access information. As discussed above, in an embodiment of block 810, the storage target engine(s) 712*a* in the storage system(s) 712 may execute the I/O command generated by the LCS 702 directly with that LCS 702 using the LCS direct memory access information. For example, with reference to FIG. 10D and for a read I/O command initiated by the LCS 702, the storage target engine(s) 712*a* may perform I/O operations 1006 that may include the storage target engine(s) 712*a* either reading data from the persistent memory devices 712*c*, or generating and transmitting a read I/O request to the storage devices 712*b* that may include the physical storage space(s) in the storage system(s) 712 at which data is stored and should be read, and the storage devices 712*b* reading that data from those physical storage space(s) in the storage system(s) 712, writing that data to the volatile memory device(s) in the storage target engine(s) 712*a*, and generating and transmitting a read response to the storage target engine(s) 712*a*. The storage target engine(s) 712*a* may then use the RDMA memory buffer reference(s) in the SGL of the NVMe-OF write request received from the SDS server device 706 to perform an RDMA write operation that either writes the data that was read from the persistent memory devices 712*c* directly in the storage space(s) in the memory system 702*a* of the LCS 702 (e.g., via the network 704) identified by the RDMA memory buffer reference(s), or reads the data from the volatile memory device(s) in the storage target engine(s) 712*a* and directly writes that data in the storage space(s) in the memory system 702*a* of the LCS 702 (e.g., via the network 704) identified by the RDMA memory buffer reference(s).

Figure 10E:
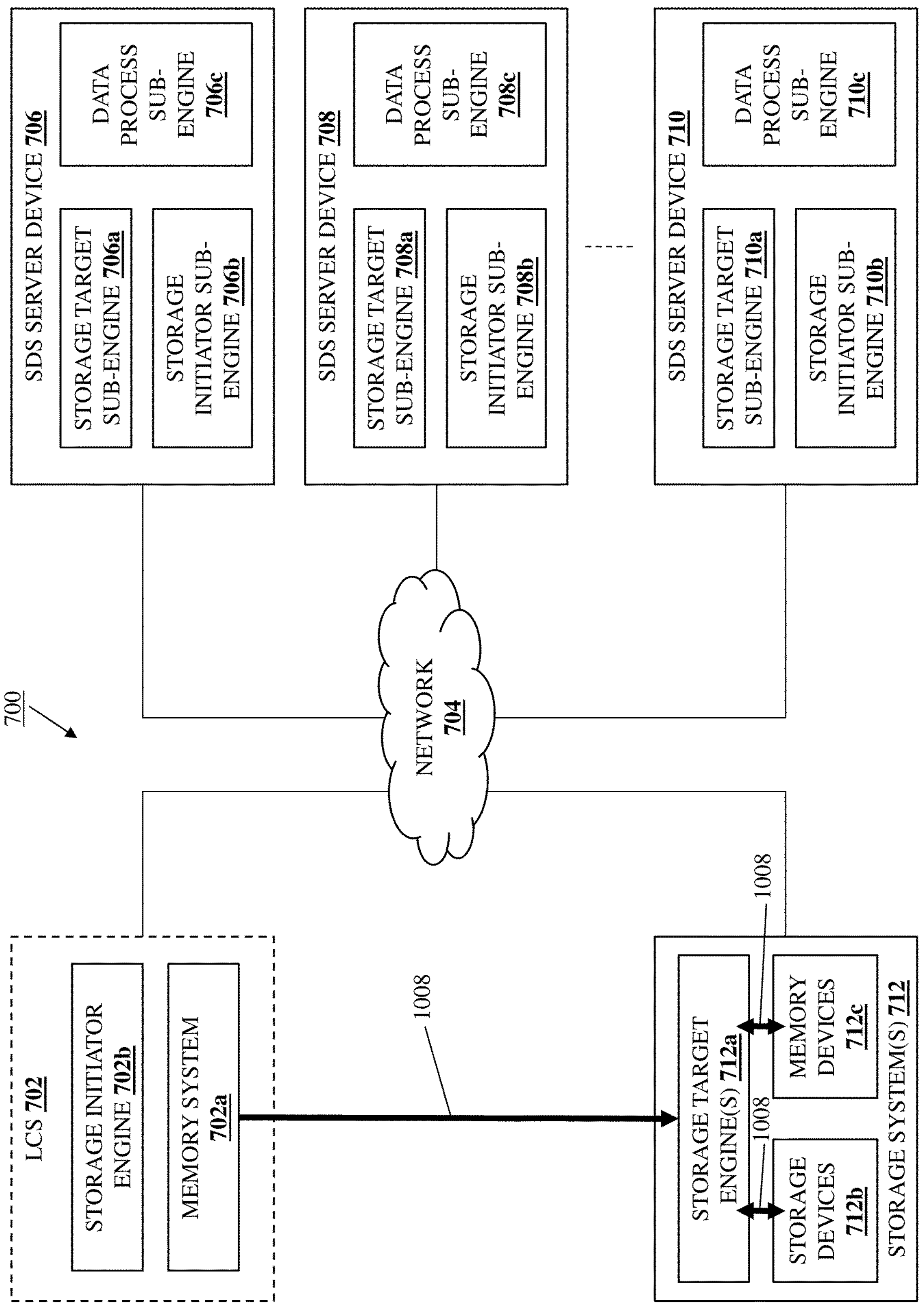
FIG. 10E is a schematic view illustrating an embodiment of the LCS provisioning system of FIG. 7 operating during the method of FIG. 8.

In another example, with reference to FIG. 10E and for a write I/O command initiated by the LCS 702, the storage target engine(s) 712*a* in the storage system(s) 712 may perform I/O operations 1008 that may include the storage target engine(s) 712*a* using the RDMA memory buffer reference(s) in the SGL of the NVMe-oF write request received from the SDS server device 706 to perform an RDMA read operation that directly reads data in the storage space(s) in the memory system 702*a* of the LCS 702 (e.g., via the network 704) identified by the RDMA memory buffer reference(s), and either writes that data to the persistent memory devices 712*c* in the storage system(s) 712, or writes that data to volatile memory device(s) in the storage target engine(s) 712*a*, followed by the storage target engine(s) 712*a* generating and transmitting a write I/O request to the storage devices 712*b* that causes the storage devices 712*b* to read that data from the volatile memory device(s) in the storage target engine(s) 712*a*, store that data, and generate and transmit a write response to the storage target engine(s) 712*a*.

Figure 10F:
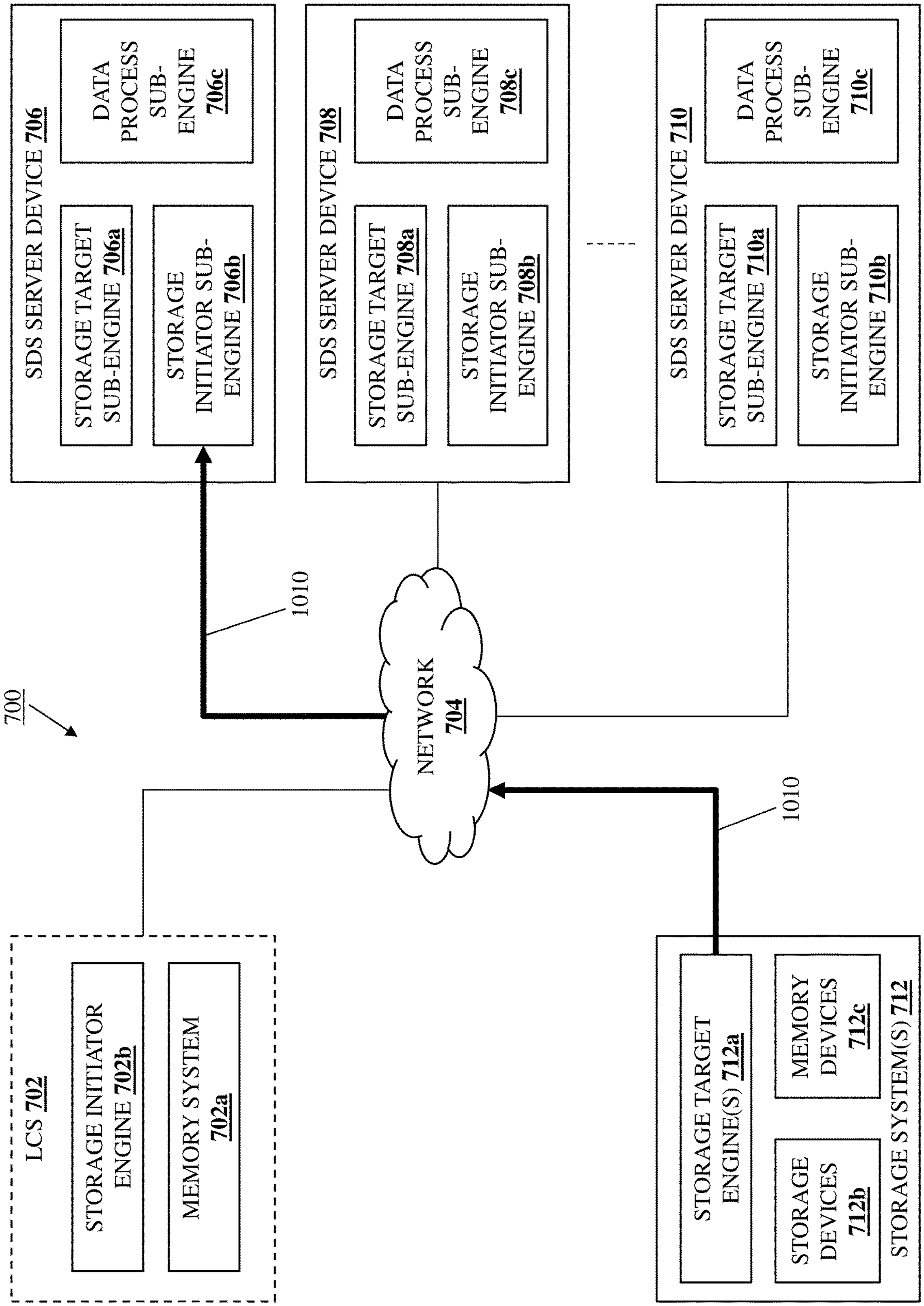
FIG. 10F is a schematic view illustrating an embodiment of the LCS provisioning system of FIG. 7 operating during the method of FIG. 8.

With reference to FIG. 10F, the storage system(s) 712 and the SDS server device 706 may perform I/O operations 1010 that include transmitting an I/O command response via the network 704 from the storage system(s) 712 to the SDS server device 706. For example, for a read I/O command initiated by the LCS 702, the I/O operations 1010 may include the storage target engine(s) 712*a* in the storage system(s) 712 transmitting an NVMe-oF read response to the storage initiator sub-engine 706*b* in the SDS server device 706 that confirms the reading of the data from the storage system(s) 712 and the writing of that data to the LCS 702. In another example, for a write I/O command initiated by the LCS 702, the I/O operations 908 may include the storage target engine(s) 712*a* in the storage system(s) 712 transmitting an NVMe-oF write response to the storage initiator sub-engine 706*b* in the SDS server device 706 that confirms the writing of the data from the LCS 702 to the storage system(s) 712.

Figure 10G:
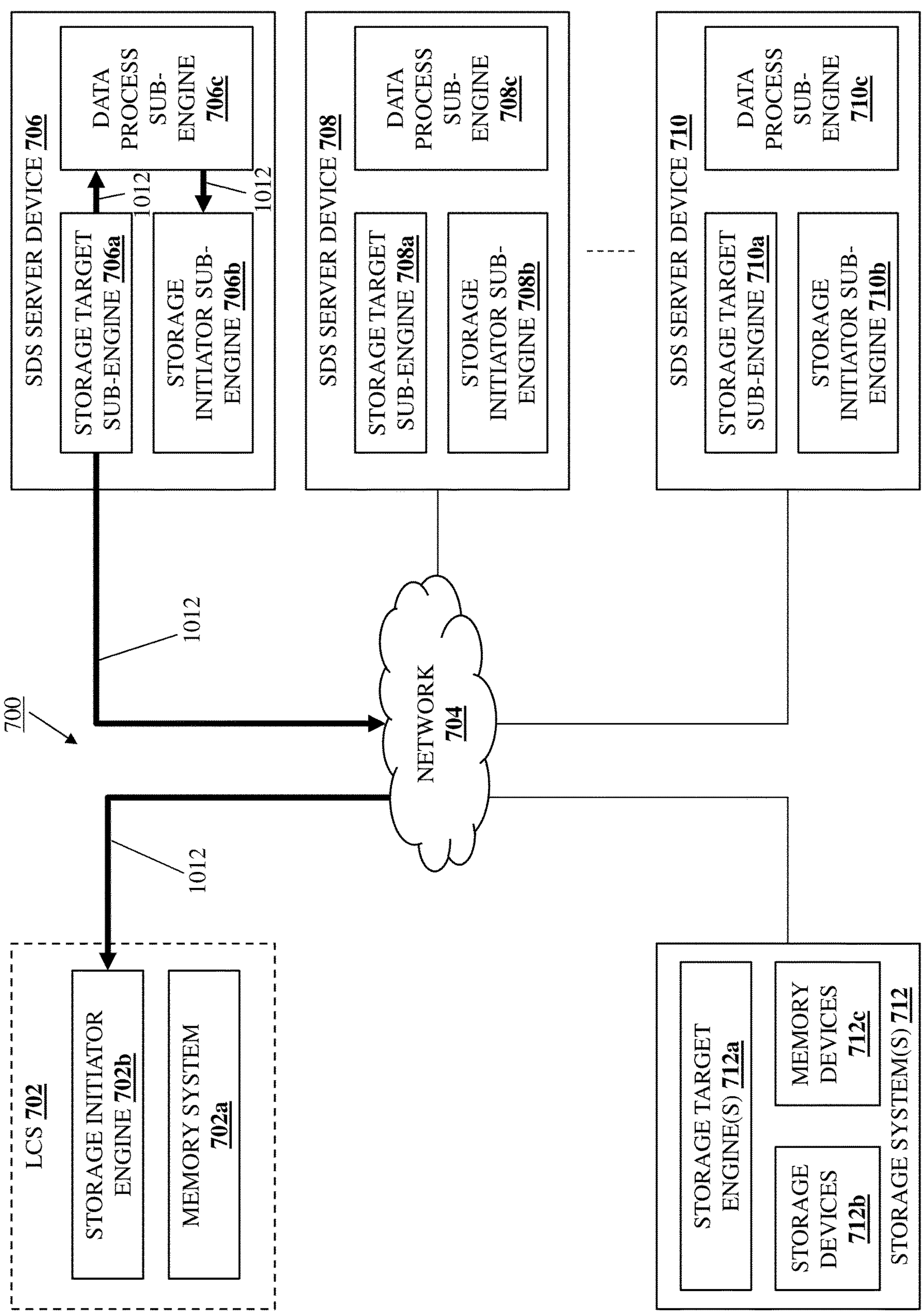
FIG. 10G is a schematic view illustrating an embodiment of the LCS provisioning system of FIG. 7 operating during the method of FIG. 8.

With reference to FIG. 10G, the SDS server device 706 and the LCS 702 may perform I/O operations 1012 that may include the storage initiator sub-engine 706*a* in the SDS server device 706 transmitting an I/O command response to the data process sub-engine 706*c* in the SDS server device 706, the data process sub-engine 706*c* transmitting an I/O command response to the storage target sub-engine 706*a* in the SDS server device 706, and the storage target sub-engine 706*a* transmitting an I/O response via the network 704 to the LCS 702. For example, for a read I/O command initiated by the LCS 702, the I/O operations 910 may include the storage initiator sub-engine 706*a* transmitting a read response to the data process sub-engine 706*c*, the data process sub-engine 706*c* transmitting a read response to the storage target sub-engine 706*a*, and the storage target sub-engine 706*a* transmitting an NVMe-oF read response to the storage initiator engine 702*b* in the LCS 702 that confirms the reading of the data from the storage system(s) 712 and the writing of that data to the LCS 702.

In another example, for a write I/O command initiated by the LCS 702, the I/O operations 910 may include the storage initiator sub-engine 706*a* in the SDS server device 706 transmitting a write response to the data process sub-engine 706*c*, the data process sub-engine 706*c* transmitting a write response to the storage target sub-engine 706*a*, and the storage target sub-engine 706*a* transmitting an NVMe-oF write response to the storage initiator engine 702*b* in the LCS 702 that confirms the writing of the data from the LCS 702 to the storage system(s) 712. Similarly as discussed above, while the simplified examples herein described single I/O commands and corresponding responses, multiple I/O commands and corresponding responses will fall within the scope of the present disclosure as well. For example, when a write I/O command from the LCS 702 results in multiple write I/O operations to the storage devices 712*b* in the storage system(s) 712, the data process sub-engine 706*c* in the SDS server device 706 may only transmit the write response discussed above to the LCS 702 after it has received the respective NVMe-OF write responses from the storage target engine(s) 712*a* in the storage system(s) 712 for each of those write I/O operations.

As such, the systems and methods of the present disclosure provide for the direct execution of I/O commands between an LCS (or other computing system) and a storage system in a disaggregated infrastructure without requiring the use of processing resources, memory resources, and network bandwidth to forward and copy data at any "hops" between the LCS (or other computing system) and the storage system, resulting in performance and resource utilization improvements relative to conventional disaggregated infrastructure I/O execution systems.

Thus, systems and methods have been described that provide for the SDS enablement of the direct execution of I/O commands in a disaggregated infrastructure between a computing system and a storage system. For example, the SDS-enabled disaggregated infrastructure direct I/O execution system of the present disclosure may include an SDS subsystem that is coupled to each of a computing system and a storage system. The SDS subsystem receives an I/O command from the computing system that is directed to the storage system and that includes computing system direct memory access information. The SDS subsystem translates the I/O command to provide a translated I/O command. The SDS subsystem then provides the translated I/O command along with the computing system direct memory access information to the storage system. The storage system may then execute the translated I/O command directly with the computing system using the computing system direct memory access information. As such, the conventional use of processing resources, memory resources, and network bandwidth for data as it moves through multiple "hops" between a computing system and a storage system during execution of an I/O command in a disaggregated infrastructure is eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Software-Defined Storage (SDS)-enabled disaggregated infrastructure direct Input/Output (I/O) execution system, comprising:

a computing system that provides a host;

a storage system that provides an SDS storage cluster and that is coupled to the computing system via a network; and a Software-Defined Storage (SDS) subsystem that is coupled to each of the computing system and the storage system via the network, wherein the SDS subsystem is configured to:

receive, from the computing system via the network, an Input/Output (I/O) command that is directed to one or more logical storage spaces in the SDS storage cluster provided by the storage system and that includes computing system remote direct memory access information;

translate the one or more logical storage spaces in the SDS storage cluster to which the I/O command is directed to one or more physical storage spaces in the storage system, and generate a translated I/O command directed to the one or more one or more physical storage spaces in the storage system; and provide the translated I/O command along with the computing system remote direct memory access information via the network to the storage system to cause the storage system to execute the translated I/O command directly with the computing system via the network using the computing system remote direct memory access information.

2. The system of claim 1, wherein the translating the I/O command includes performing logical-to-physical mapping operations to translate the one or more logical storage spaces to the one or more physical storage spaces.

3. The system of claim 1, wherein the I/O command is a read I/O command that the SDS subsystem is configured to translate to provide the translated I/O command provided by a translated read I/O command that, when provided along with the computing system remote direct memory access information to the storage system, causes the storage system to execute the translated read I/O command to transmit data stored in the storage system directly to the computing system based on the computing system remote direct memory access information.

4. The system of claim 1, wherein the I/O command is a write I/O command that the SDS subsystem is configured to translate to provide the translated I/O command provided by a translated write I/O command that, when provided along with the computing system remote direct memory access information to the storage system, causes the storage system to execute the translated write I/O command to retrieve data stored in the computing system directly from the computing system and store that data in the storage system based on the computing system remote direct memory access information.

5. The system of claim 1, wherein the network is a Transport Control Protocol (TCP) network.

6. The system of claim 1, wherein the SDS subsystem is configured to:

provide, to the storage system along with the translated I/O command and the computing system remote direct memory access information, computing system/storage system connection information that is configured for use by the storage system in connecting to the computing system to execute the translated I/O command directly with the computing system.

7. An Information Handling System (IHS), comprising:

a processing system; and a memory system that is coupled to the processing system and that includes instructions that, when executed by the processing system, cause the processing system to provide a Software-Defined Storage (SDS) engine that is configured to:

receive, via a network from a computing system that provides a host, an Input/Output (I/O) command that is directed to one or more logical storage spaces in an SDS storage cluster provided by a storage system and that includes computing system remote direct memory access information;

translate the one or more logical storage spaces in the SDS storage cluster to which the I/O command is directed to one or more physical storage spaces in the storage system, and generate a translated I/O command directed to the one or more one or more physical storage spaces in the storage system; and provide the translated I/O command along with the computing system remote direct memory access information via the network to the storage system to cause the storage system to execute the translated I/O command directly with the computing system via the network using the computing system direct memory access information.

8. The IHS of claim 7, wherein the translating the I/O command includes performing logical-to-physical mapping operations to translate the one or more logical storage spaces to the one or more physical storage spaces.

9. The IHS of claim 7, wherein the I/O command is a read I/O command that the SDS engine is configured to translate to provide the translated I/O command provided by a translated read I/O command that, when provided along with the computing system remote direct memory access information to the storage system, causes the storage system to execute the translated read I/O command to transmit data stored in the storage system directly to the computing system based on the computing system remote direct memory access information.

10. The IHS of claim 7, wherein the I/O command is a write I/O command that the SDS engine is configured to translate to provide the translated I/O command provided by a translated write I/O command that, when provided along with the computing system remote direct memory access information to the storage system, causes the storage system to execute the translated write I/O command to retrieve data stored in the computing system directly from the computing system and store that data in the storage system based on the computing system remote direct memory access information.

11. The IHS of claim 7, wherein the network is a Transport Control Protocol (TCP) network.

12. The IHS of claim 7, wherein the SDS engine is configured to:

provide, to the storage system along with the translated I/O command and the computing system remote direct memory access information, computing system/storage system connection information that is configured for use by the storage system in connecting to the computing system to execute the translated I/O command directly with the computing system.

13. The IHS of claim 7, wherein the I/O command includes a Non-Volatile Memory express (NVMe) I/O command including a Scatter Gather List (SGL) having at least one Remote Direct Memory Access (RDMA) buffer reference that provides the computing system remote direct memory access information.

14. A method for Software-Defined Storage (SDS)-enabled direct Input/Output (I/O) execution in a disaggregated infrastructure, comprising:

receiving, by a Software Defined Storage (SDS) subsystem via a network from a computing system that provides a host, an Input/Output (I/O) command that is directed to one or more logical storage spaces in an SDS storage cluster provided by a storage system and that includes computing system remote direct memory access information;

translating, by the SDS subsystem, the one or more logical storage spaces in the SDS storage cluster to which the I/O command is directed to one or more physical storage spaces in the storage system, and generate a translated I/O command directed to the one or more one or more physical storage spaces in the storage system; and providing, by the SDS subsystem, the translated I/O command along with the computing system remote direct memory access information via the network to the storage system to cause the storage system to execute the translated I/O command directly with the computing system via the network using the computing system remote direct memory access information.

15. The method of claim 14, wherein the translating the I/O command includes performing logical-to-physical mapping operations to translate the one or more logical storage spaces to the one or more physical storage spaces.

16. The method of claim 14, wherein the I/O command is a read I/O command that the SDS subsystem translates to provide the translated I/O command provided by a translated read I/O command that, when provided along with the computing system remote direct memory access information to the storage system, causes the storage system to execute the translated read I/O command to transmit data stored in the storage system directly to the computing system based on the computing system remote direct memory access information.

17. The method of claim 14, wherein the I/O command is a write I/O command that the SDS subsystem translates to provide the translated I/O command provided by a translated write I/O command that, when provided along with the computing system remote direct memory access information to the storage system, causes the storage system to execute the translated write I/O command to retrieve data stored in the computing system directly from the computing system and store that data in the storage system based on the computing system remote direct memory access information.

18. The method of claim 14, wherein the network is a Transport Control Protocol (TCP) network.

19. The method of claim 14, further comprising:

provide, by the SDS subsystem to the storage system along with the translated I/O command and the computing system remote direct memory access information, computing system/storage system connection information that is configured for use by the storage system in connecting to the computing system to execute the translated I/O command directly with the computing system.

20. The method of claim 14, wherein the I/O command includes a Non-Volatile Memory express (NVMe) I/O command including a Scatter Gather List (SGL) having at least one Remote Direct Memory Access (RDMA) buffer reference that provides the computing system remote direct memory access information.

* * * * *